US012523954B2

(12) United States Patent
Miyajima

(10) Patent No.: US 12,523,954 B2
(45) Date of Patent: Jan. 13, 2026

(54) PRINTING APPARATUS, METHOD OF CONTROLLING THE SAME, AND STORAGE MEDIUM

(71) Applicant: CANON KABUSHIKI KAISHA, Tokyo (JP)

(72) Inventor: Jun Miyajima, Ibaraki (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/736,665

(22) Filed: Jun. 7, 2024

(65) Prior Publication Data

US 2024/0329582 A1 Oct. 3, 2024

Related U.S. Application Data

(63) Continuation of application No. 17/324,245, filed on May 19, 2021, now Pat. No. 12,025,937.

(30) Foreign Application Priority Data

May 22, 2020 (JP) ................................ 2020-089929
Mar. 15, 2021 (JP) ................................ 2021-041643

(51) Int. Cl.
*G03G 15/23* (2006.01)
*B41J 29/38* (2006.01)
*G03G 15/00* (2006.01)

(52) U.S. Cl.
CPC ....... *G03G 15/234* (2013.01); *G03G 15/5012* (2013.01); *G03G 15/5054* (2013.01); *G03G 2215/00586* (2013.01)

(58) Field of Classification Search
None
See application file for complete search history.

(56) References Cited

U.S. PATENT DOCUMENTS 4,978,980 A 12/1990 Noguchi et al.
8,744,335 B2 6/2014 Matsumoto et al.
8,843,055 B2 9/2014 Matsumoto et al.
12,025,937 B2 * 7/2024 Miyajima ............ G03G 15/234
2011/0280643 A1 11/2011 Matsumoto et al.
(Continued)

FOREIGN PATENT DOCUMENTS

JP 3880281 B2 2/2007
JP 2010-173186 A 8/2010
(Continued)

*Primary Examiner* — Douglas X Rodriguez
*Assistant Examiner* — Ruben C Parco, Jr.
(74) *Attorney, Agent, or Firm* — VENABLE LLP

(57) ABSTRACT

A printing apparatus receives and executes a mixed print job in which single-sided printing and double-sided printing are mixed and includes a feeding unit that accumulates and feeds a plurality of sheets, a printer unit that prints an image on a sheet, a double-sided conveyance path that includes a refeeding unit to refeed a sheet in which an image has been printed on a first side of the sheet and to feed the sheet in order to print an image on a second side of the sheet. The printing apparatus executes double-sided print processing in a case where a print job in which a page corresponding to a sheet for which double-sided printing is instructed is included but a page corresponding to a sheet for which single-sided printing is instructed is not included.

7 Claims, 22 Drawing Sheets

(56) References Cited

U.S. PATENT DOCUMENTS

| | | | |
|---|---|---|---|
| 2013/0202338 | A1 | 8/2013 | Matsumoto et al. |
| 2018/0043707 | A1 | 2/2018 | Arisawa |

FOREIGN PATENT DOCUMENTS

| | | | | |
|---|---|---|---|---|
| JP | 2012-003252 | A | | 1/2012 |
| JP | 2016-159438 | A | | 9/2016 |
| JP | 2018176562 | A | * | 11/2018 |

* cited by examiner

FIG. 5B
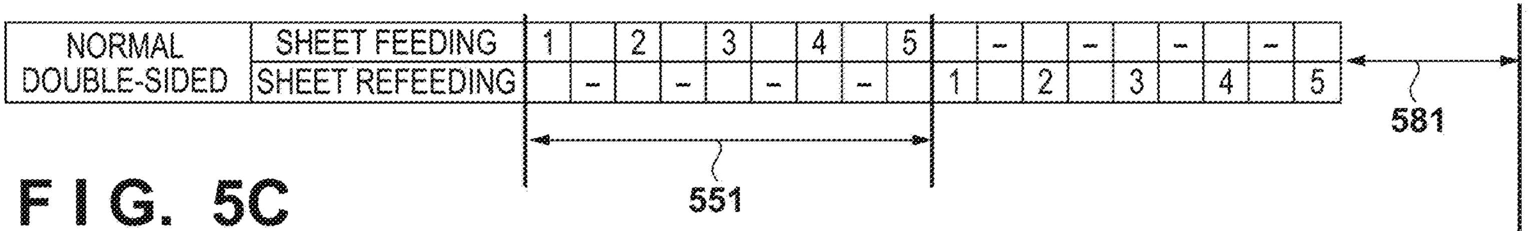
FIG. 5C
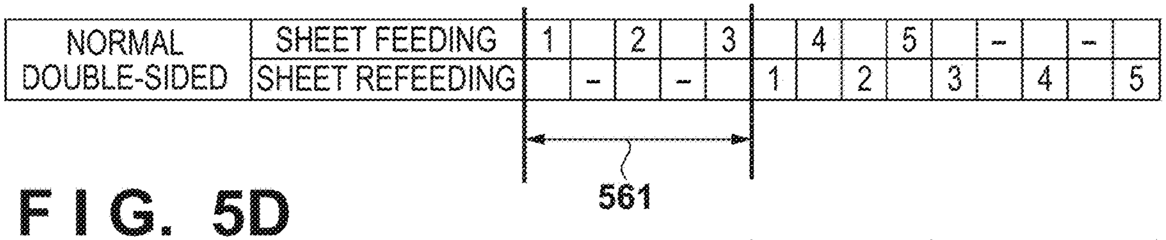
FIG. 5D
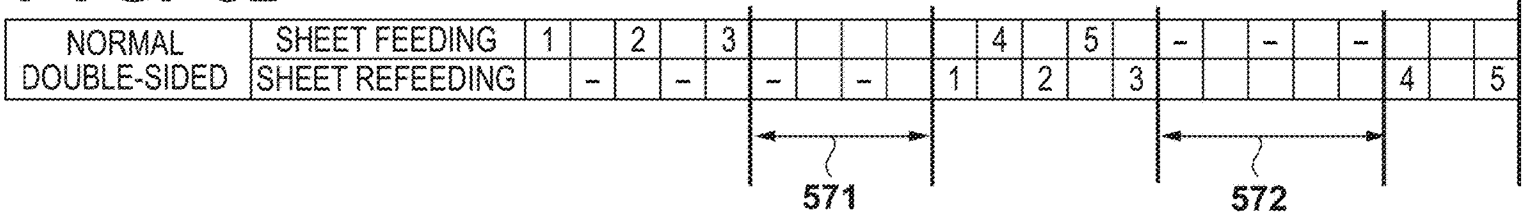
FIG. 5E
| | NUMBERS OF SHEETS OF DOUBLE-SIDED CIRCULATION | NUMBER OF SHEETS THAT CAN BE SUCCESSIVELY FED BEFORE STARTING SHEET REFEEDING |
|---|---|---|
| NORMAL DOUBLE-SIDED | 9 SHEETS CIRCULATION | 5 SHEETS |
| OVERTAKING DOUBLE-SIDED | 5 SHEETS CIRCULATION | 3 SHEETS |

NORMAL DOUBLE -SIDED
SHEET FEEDING
SHEET REFEEDING
1201
1202
1203

FORCED DOUBLE -SIDED
SHEET FEEDING
SHEET REFEEDING
1211
OVERTAKING DOUBLE -SIDED
SHEET FEEDING
SHEET REFEEDING
1251

PRINTING APPARATUS, METHOD OF CONTROLLING THE SAME, AND STORAGE MEDIUM

This application is a continuation of application Ser. No. 17/324,245, filed May 19, 2021.

BACKGROUND OF THE INVENTION

Field of the Invention

The present invention relates to a printing apparatus, a method of controlling the same, and a storage medium.

Description of the Related Art

Heretofore, a circulation type paper conveyance method has been used as a method of forming images on both sides of each of a plurality of sheets of paper (sheets). In this method, a sheet of paper is conveyed to a transfer unit for transferring an image, an image is transferred to one side (first side) of the sheet of paper by the transfer unit, and thereafter, the sheet of paper on which the image has been transferred is sent to a reversing unit. Then, the sheet of paper whose front and back is reversed by the reversing unit is again conveyed to the transfer unit via a conveyance path for second side of the double-sided printing, and an image is transferred on the second side of the sheet of paper by the transfer unit.

In U.S. Pat. No. 4,978,980, double-sided circulation control is described in which, in double-sided printing of a plurality of sheets, a predetermined number of sheets are successively paper-fed, and thereafter paper feeding and paper refeeding are alternatingly performed, instead of performing paper feeding and paper refeeding for each sheet of paper, in order to improve the productivity of image formation.

Also, it is also required that a job in which single-sided printing and double-sided printing are mixed is executed at a high speed. In the control described in U.S. Pat. No. 4,978,980, after an image is formed on a front surface of a first sheet of paper of double-sided printing, the sheet of paper is caused to circulate in a double-sided conveyance path, and therefore a period of time is incurred until image formation is performed on the back surface. Therefore, every time switching is performed from double-sided printing to single-sided printing, a fixed time is needed, and as a result, there is a problem in that the total printing speed largely decreases.

In order to solve this problem, in a technique disclosed in Japanese Patent No. 3880281, when a sheet of paper of double-sided printing and a sheet of paper of single-sided printing are mixed, even if a sheet of paper is a sheet of paper of single-sided printing, the sheet of paper is handled as a sheet of paper of double-sided printing whose second side is blank. Also, a conveyance control method is proposed in which, as a result of successively executing double-sided printing, the double-sided circulation printing is not interrupted (forced double-sided control).

Moreover, U.S. Pat. No. 8,843,055 describes a technique for executing, at a high speed, a job in which single-sided printing and double-sided printing are mixed. According to this technique, image formation of a front surface of double-sided printing that is present after a group of pages of single-sided printing is executed prior to the group of pages of single-sided printing, and the printed sheet is caused to retreat to a double-sided conveyance path, and then printing and discharging of the group of pages of single-sided printing are performed. Thereafter, with respect to the sheet retreated to the double-sided conveyance path, printing of a remaining back surface of double-sided printing and discharging are performed. As described above, a technique for executing, at a high speed, a job in which single-sided printing and double-sided printing are mixed is proposed (overtaking double-sided control). With this, single-sided printing is executed in parallel by effectively using the period of time during which a sheet on which an image is formed on its front surface by double-sided printing waits in a double-sided conveyance path or the sheet is conveyed in the double-sided conveyance path, and as a result, the total printing time can be largely reduced relative to a known technique. Also, Japanese Patent Laid-Open No. 2018-176562 describes a technique in which, when single-sided printing is performed in double-sided circulation control in which predetermined number of sheets are successively fed in double-sided printing, and thereafter paper feeding and paper refeeding are alternatingly performed, the double-sided circulation is continued by forcibly performing double-sided printing. Also, a technique is described in which, a counter is provided for counting the number of times of successively performing the forced double-sided printing, and if the counter value exceeds a certain threshold value, the forced double-sided printing is interrupted and single-sided printing is performed.

As described above, the methods described in Japanese Patent No. 3880281 and U.S. Pat. No. 8,843,055 are conveyance control methods for executing, at a high speed, a job in which single-sided printing and double-sided printing are mixed (hereinafter called as "single/double mixed print control"). In the single/double mixed print control, the most suitable single/double mixed print control needs to be selected in accordance with the state of sheets in a printing apparatus and the single/double mixing state in a job to be executed. However, it is difficult for a user to select the single/double mixed print control that is most suitable to a job to be executed. There is a problem in that, depending on the selection of single/double mixed print control, the execution performance of a job is instead degraded.

SUMMARY OF THE INVENTION

An aspect of the present invention is to eliminate the above-mentioned problem with conventional technology.

A feature of the present invention is to provide a technique for enabling a printing apparatus to automatically select and execute a most suitable print control method, regarding a print job in which single-sided printing and double-sided printing are mixed.

According to a first aspect of the present invention, there is provided a printing apparatus capable of receiving and executing a print job in which single-sided printing and double-sided printing are mixed, the printing apparatus comprising:

a sheet conveyance path that includes a plurality of waiting positions at which a sheet in which printing has been performed on a first side in double-sided printing is caused to wait in order to print an image on a second side of the sheet;

a memory device that stores instructions; and one or more processors that execute the instructions stored in the memory device to cause the printing apparatus to:

selectively execute print control such as:

(1) first print control in which single-sided printing is performed on a sheet regarding which single-sided printing is instructed, and double-sided printing is performed on a sheet regarding which double-sided printing is instructed, (2) second print control in which printing is performed on a sheet regarding which single-sided printing is instructed that is present between a plurality of sheets regarding which double-sided printing is instructed, so as to perform conveyance control similarly to a sheet regarding which double-sided printing is instructed such that the sheet is caused to be conveyed on a conveyance path for double-sided printing of the sheet conveyance path after single-sided printing is performed, and (3) third print control in which printing is performed, in advance to a sheet regarding which single-sided printing is instructed, on a first side of a following sheet regarding which double-sided printing is instructed, and single-sided printing is performed on the sheet regarding which single-sided printing is instructed in advance to printing on a second side of double-sided printing of the sheet, retain information regarding a sheet to be fed in accordance with the first to third print control in a sheet feed wait queue, and select and execute one of the first to third print control based on a printing order of single-sided printing and double-sided printing in the print job, the number of the plurality of waiting positions, and information retained in the sheet feed wait queue.

According to a second aspect of the present invention, there is provided a method of controlling a printing apparatus that includes a sheet conveyance path that includes a plurality of waiting positions at which a sheet in which printing has been performed on a first side in double-sided printing is caused to wait in order to print an image on a second side of the sheet, and can receive and execute a print job in which single-sided printing and double-sided printing are mixed, the method comprising:

selectively executing print control such as:

(1) first print control in which single-sided printing is performed on a sheet regarding which single-sided printing is instructed, and double-sided printing is performed on a sheet regarding which double-sided printing is instructed, (2) second print control in which printing is performed on a sheet regarding which single-sided printing is instructed that is present between a plurality of sheets regarding which double-sided printing is instructed, so as to perform conveyance control such that the sheet is caused to be conveyed on a conveyance path for double-sided printing of the sheet conveyance path after single-sided printing is performed, and (3) third print control in which printing is performed, in advance to a sheet regarding which single-sided printing is instructed, on a first side of a following sheet regarding which double-sided printing is instructed, and single-sided printing is performed on the sheet regarding which single-sided printing is instructed in advance to printing on a second side of double-sided printing of the sheet:

retaining information regarding a sheet to be fed in accordance with print control regarding the print job; and selecting and executing one of the first to third print control based on a printing order of single-sided printing and double-sided printing in the print job, the number of the plurality of waiting positions, and information retained in the sheet feed wait queue.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIGS. 5A to 5E are diagrams for describing, in a simplified manner, the state of conveying sheets in the image forming apparatus according to the first embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Also, a plurality of features may be arbitrarily combined.

Figure 1:
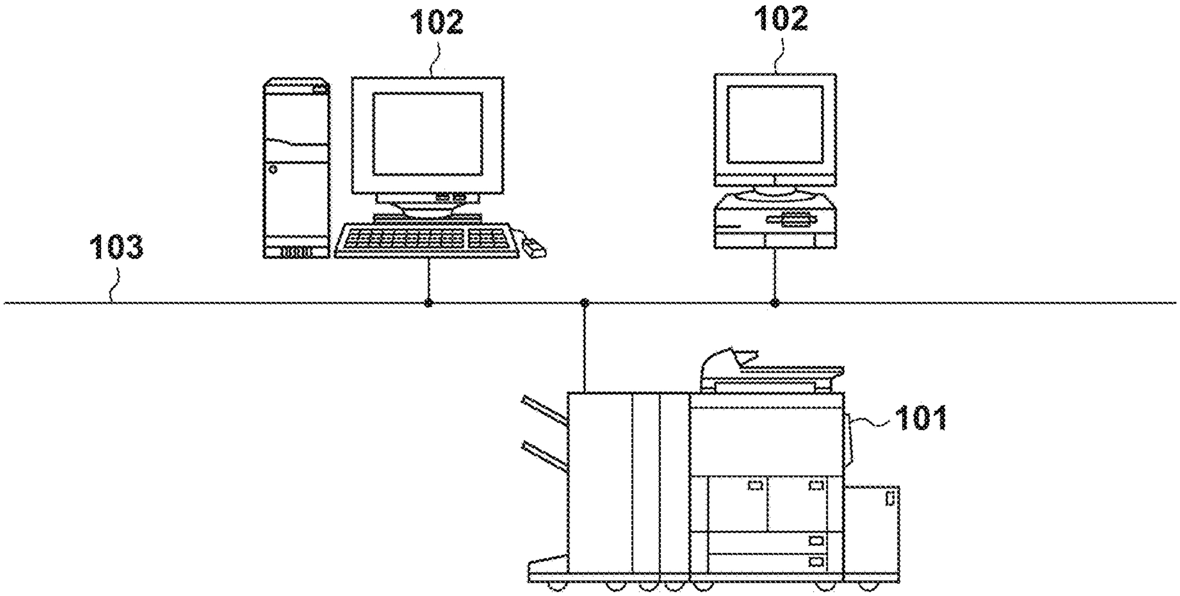
FIG. 1 is a diagram for describing a configuration of a printing system including an image forming apparatus according to a first embodiment of the invention.

FIG. 1 is a diagram for describing a configuration of a printing system including an image forming apparatus (printing apparatus) 101 according to a first embodiment of the invention.

A host computer 102 transmits print data to the image forming apparatus 101 according to the first embodiment via a network 103. The host computer 102 also has a function of performing image editing processing by operating an image processing application, in addition to the function of transmitting print data. The image forming apparatus 101 communicates with the host computer 102 via the network 103. In this printing system, the image forming apparatus 101 forms an image according to print data received from the host computer 102 via the network 103. Note that the network 103 may be a wired network or a wireless network. Also, a plurality of host computers 102 may be connected to the network 103, as shown in FIG. 1.

Figure 2:
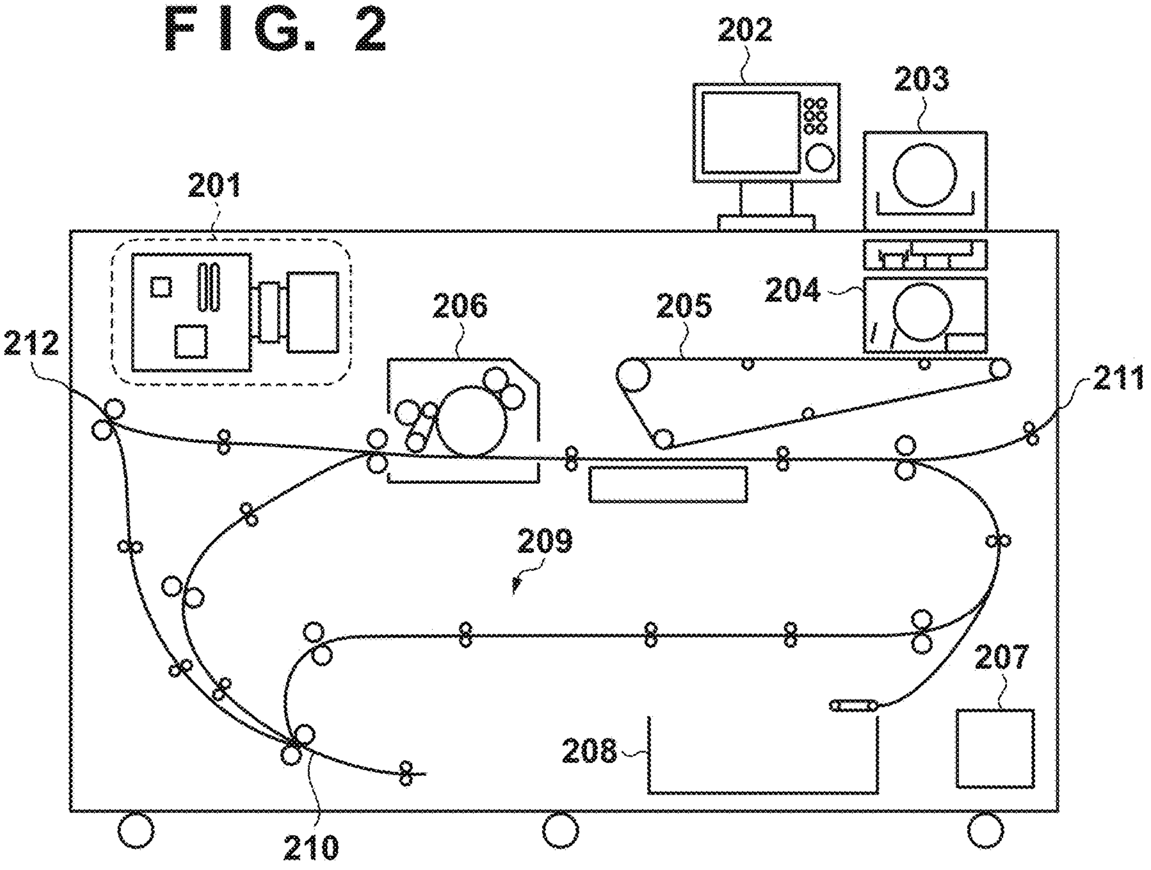
FIG. 2 depicts a view illustrating a schematic cross-section for describing a mechanism of the image forming apparatus according to the first embodiment.

FIG. 2 depicts a view illustrating a schematic cross-section for describing a mechanism of the image forming apparatus 101 according to the first embodiment.

A controller 201 controls the operations of the image forming apparatus 101 by executing software for performing various types of control of the image forming apparatus 101. A console unit 202 includes a hard key and the like that are operated by an operator and are for receiving instructions of various operations to the image forming apparatus 101 and a display unit that displays and presents various types of information to the operator. Note that the display unit may include a touch panel function. A toner supplying unit 203 supplies toner, which is developer, to an image forming unit of the image forming apparatus 101. The toner supplying unit 203 is equipped with a door, and the operator can supply toner through the door. An image forming unit 204 forms an image instructed by print data on an intermediate transfer belt 205 using toner supplied by the toner supplying unit 203. The image formed on the intermediate transfer belt 205 is transferred to a print medium such as a sheet. A fixing unit 206 applies heat and pressure to a sheet on which an image is transferred from the intermediate transfer belt 205, and fixes the toner image on the sheet. An excess toner collection unit 207 collects and accumulates toner remained on the intermediate transfer belt 205 without being transferred to a sheet. A feeding unit 208 can accumulate a plurality of sheets, and the sheets in the feeding unit 208 are respectively conveyed to the image forming unit 204 by a sheet conveyance unit 209, and are used for image formation. Also, the sheet conveyance unit 209 conveys a sheet on which an image is formed by the image forming unit 204 to the fixing unit 206 for fixing the image transferred to the sheet. A switchback unit 210 reverses the front and back of a sheet for performing printing on a second side of double-sided printing and for discharging the sheet with the back surface facing upward. A sheet loading portion 211 receives sheets from an external paper feeding apparatus. A discharging portion 212 discharges a sheet subjected to fixing processing to an external apparatus such as a discharging unit or a post processing device, for example.

Figure 3:
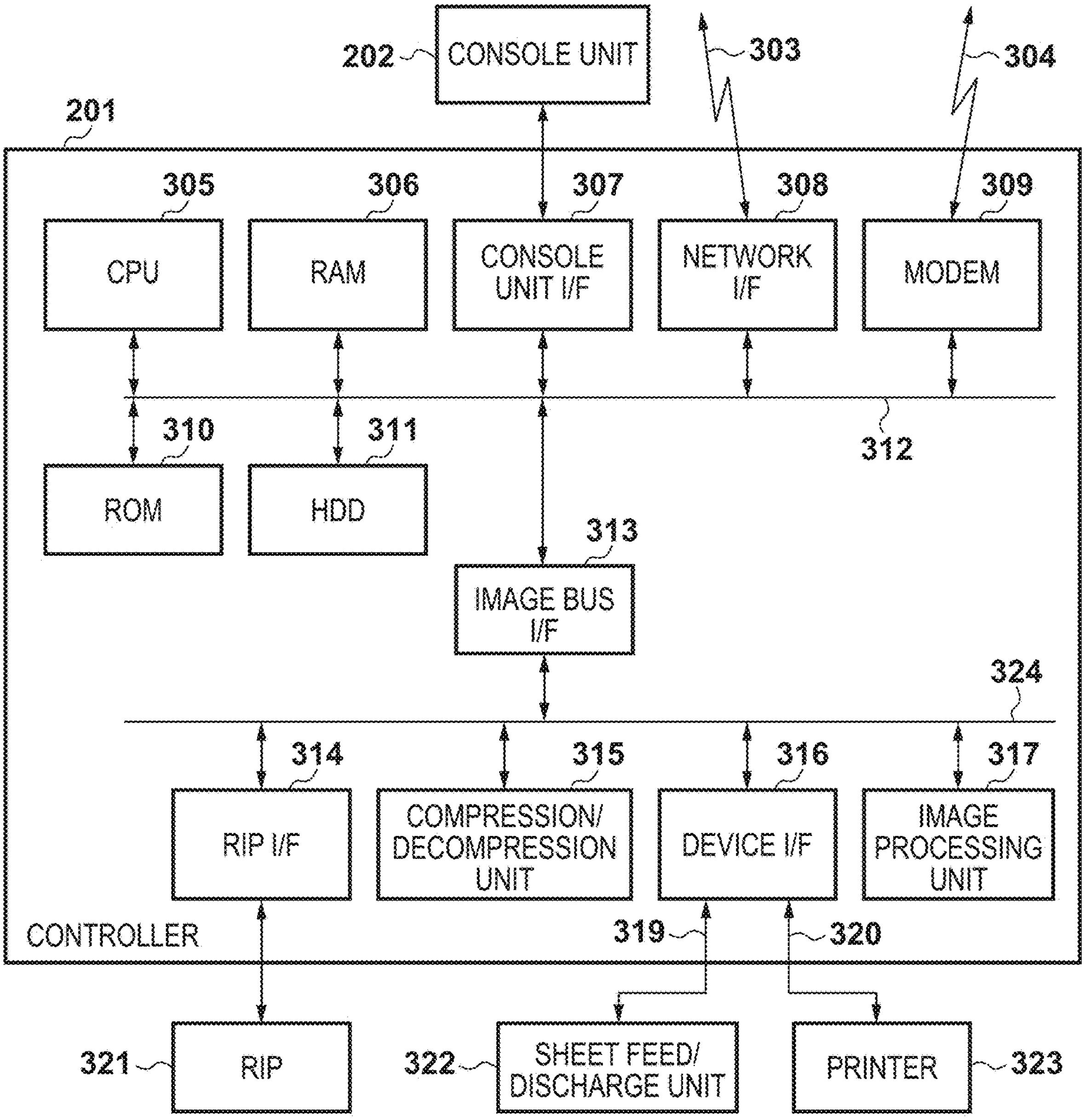
FIG. 3 is a block diagram for describing a hardware configuration of a controller of the image forming apparatus according to the first embodiment.

FIG. 3 is a block diagram for describing a hardware configuration of the controller 201 of the image forming apparatus 101 according to the first embodiment.

A network cable 303 is for connecting to the host computer 102 and an external device, which is not illustrated, via the network 103. A line cable 304 is for connecting to an external device, which is not illustrated, via a telephone line. A CPU 305 controls this controller 201 by executing a program deployed in a RAM 306. The RAM 306 provides a work memory of the CPU 305. The RAM 306 is also used as a reception buffer for temporarily storing data received from the outside, an image buffer for temporarily storing image data that is rasterized by an RIP (Raster Image Processor) 321, and the like. A console unit interface 307 is an interface for connecting the console unit 202 and the controller 201. A network I/F 308 is an interface for connecting the controller 201 and the network 103. A modem 309 is an interface for connecting the controller 201 and the telephone line. A ROM 310 stores a boot program that is executed by the CPU 305, and the like. An HDD (hard disk drive) 311 stores a program that is executed by the CPU 305, and the like. The units described above are connected to the CPU 305 via a CPU bus 312. The CPU 305 deploys a program stored in the HDD 311 in the RAM 306 by executing the aforementioned boot program, and controls the operations of the image forming apparatus 101 by executing the deployed program.

An image bus I/F 313 functions as a bus bridge for connecting an image bus 324 for transferring image data at a high speed and the CPU bus 312. The image bus 324 is connected to a hardware group for performing image processing. The RIP 321 is a rasterizing unit that has a function of converting page description data input from the outside to bitmap image data. A RIP I/F 314 is an interface for connecting the RIP 321 and the image bus 324. A compression/decompression unit 315 performs compression and decompression of data. A sheet feed unit/discharge unit 322 includes the feeding unit 208 in FIG. 2 and a discharging unit (not illustrated). A printer 323 includes the image forming unit 204, the fixing unit 206, and the intermediate transfer belt 205 in FIG. 2 and the like, and forms (prints) an image on a sheet. A device I/F 316 is an interface for connecting the printer 323 and the sheet feed unit/discharge unit 322 to the image bus 324 via buses 319 and 320, respectively. An image processing unit 317 performs various type of image processing on bitmap image data generated by the RIP 321. The image processing unit 317 has a function of compositing bitmap image data of two pages to bitmap image data of one page, for example, and the like. The CPU 305 performs printing by controlling the printer 323 and the sheet feed unit/discharge unit 322 in accordance with a print job that is instructed from the console unit 202 or the host computer 102 via the network cable 303.

Figure 4:
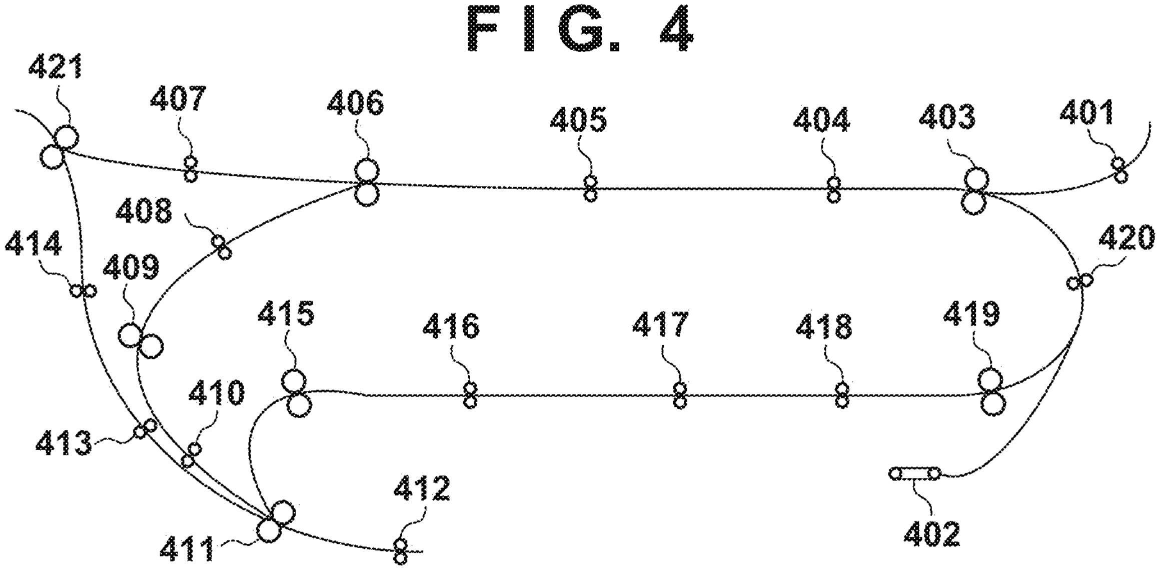
FIG. 4 is a diagram for describing a conveyance path for conveying sheets in the image forming apparatus according to the first embodiment.

FIG. 4 is a diagram for describing a conveyance path for conveying sheets in the image forming apparatus 101 according to the first embodiment.

A receiving portion 401 receives a sheet from the sheet loading portion 211 to a sheet conveyance path. Also, the receiving portion 402 receives a sheet from the feeding unit 208 in FIG. 2 to the sheet conveyance path. A discharging portion 421 corresponds to the discharging portion 212 in FIG. 2, and discharges a sheet from the sheet conveyance path to an external apparatus. Conveyance rollers 403 to 420 provided on the conveyance path are independently controlled in accordance with the sheet conveyance path.

When printing is performed only on one side of a sheet and is discharged with a printed surface facing upward, the sheet is conveyed by conveyance rollers 403, 404, 405, 406, 407, and 421, in this order. That is, the sheet passes through the uppermost conveyance path in FIG. 4. Here, the path through which the sheet passes corresponds to a path through which a sheet passes when a sheet on which an image is transferred from the intermediate transfer belt 205 passes through the fixing unit 206 and is discharged as is, in FIG. 2.

On the other hand, when printing is performed only on one side of a sheet and is discharged with a printed surface facing downward, the sheet is conveyed by the conveyance rollers 403, 404, 405, 406, 408, 409, 410, 411, 412, 411, 413, 414, and 421, in this order. Note that the conveyance rollers 411 and 412 are forward/reverse rotatable and convey a sheet in a switchback manner. That is, a sheet is discharged in a state of the front and back of the sheet being reversed as a result of having passed through the conveyance rollers 408 to 414.

Moreover, when printing is performed on both sides of a sheet, the sheet is conveyed by the conveyance rollers 403, 404, 405, 406, 408, 409, 410, 411, 412, 411, 415, 416, 417, 418, 419, 420, 403, 404, 405, 406, 407, and 421, in this order. Note that, in the case of double-sided printing as well, a conveyance path including the conveyance rollers 411 and 412 is a portion for conveying a sheet in a switchback manner, and control is performed in a state of the conveyance rollers being in reverse rotation. Also, the conveyance rollers 406 and 411 are provided with a mechanism (e.g., flapper) for switching the conveyance path for conveying a sheet.

Next, double-sided circulation control will be described with reference to FIGS. 5A to 5E.

Figure 5A:
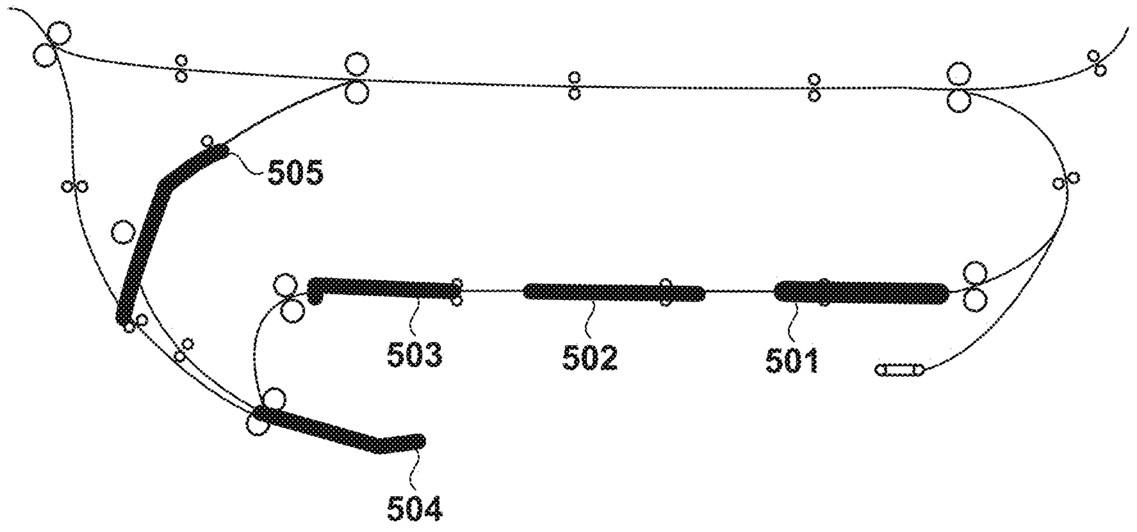

FIG. 5A is a schematic diagram showing positions at which sheets are caused to wait for double-sided printing in a conveyance path at the time of double-sided printing, and the reference numerals 501 to 505 each indicate a waiting position of a sheet waiting for paper refeeding. Here, a case is shown in which five sheets can be caused to wait.

FIG. 5B shows a sheet feeding order in nine sheets circulation in which five sheets wait for paper refeeding shown in FIG. 5A. FIG. 5C shows a sheet feeding order in five sheets circulation in which three sheets are caused to wait, different from FIG. 5B. FIG. 5D shows a sheet feeding order and sheet intervals when the five sheets circulation shown in FIG. 5C is performed on the conveyance path in the nine sheets circulation shown in FIG. 5B. Moreover, FIG. 5E shows a relationship of the number of sheets that can be precedingly fed in the nine sheets circulation and the five sheets circulation shown in FIGS. 5B and 5C.

Next, detailed descriptions will be given regarding FIGS. 5A to 5E, respectively. Note that, in FIGS. 5B to 5D, the numbers 1 to 5 indicate first to fifth sheets that are to be fed in this order.

FIG. 5A shows a case where five sheets are present on the aforementioned conveyance path at the same time. The reference numerals 501 to 505 indicate waiting positions of the respective sheets that are each waiting in order to receive, after an image is formed on a first side (e.g., front surface) of the sheet, printing on a second side (back surface), which is an opposite side to the first side. When a double-sided print operation is performed, productivity is improved by alternatingly performing paper feeding from the receiving portion 401 or 402 for first side printing and paper refeeding for performing printing on a second side.

FIG. 5B is a diagram showing the order of paper feeding and paper refeeding when double-sided printing is performed on five sheets. As shown in FIG. 5A, in the conveyance path in the image forming apparatus, five side-worth sheets can wait at the waiting positions 501 to 505 for paper refeeding. Therefore, first sides of five sheets are precedingly printed, and the printed five sheets are caused to wait as shown in FIG. 5A. Thereafter, the sheets waiting at the waiting positions 501 to 505 are refed, and printing is performed on second sides thereof. The waiting positions for paper refeeding are determined by the length of the sheet conveyance path, the mechanism and the like of the image forming apparatus. In FIG. 5B, because the number of sides of sheets that can be present on the conveyance path until a fed sheet is refed corresponds to nine sheets as shown by a reference numeral 551, it is called as nine sheets circulation.

In a model in which a first sheet is refed after three sheets are fed, a control as shown in FIG. 5C is performed. That is, the print control method is as follows. First to third sheets are successively fed and printing is performed on first sides thereof, and the first to third sheets are caused to wait for paper refeeding. Thereafter, paper refeeding for performing printing on a second side of the first to third sheets and paper feeding for performing printing on a first side of fourth and fifth sheets are alternatingly performed. In FIG. 5C, because the number of sides of sheets that can be present on the conveyance path until the sheet that is fed firstly is refed corresponds to five sheets as shown by a reference numeral 561, it is called as five sheets circulation.

FIG. 5D is a diagram for describing a case where, using a conveyance path on which waiting positions at which five side-worth sheets can wait for paper refeeding are present as shown in FIG. 5A, the five sheets circulation is performed. In this case, even if paper feeding of three sheets are precedingly performed as in the five sheets circulation, the actual length of the conveyance path is substantially longer than the sheet length, and therefore, similarly to FIG. 5B, nine side-worth sheet intervals are needed until a sheet that has been fed is refed for performing printing on a second side of the same sheet. Therefore, vacant sheet intervals are present as shown by reference numerals 571 and 572. Therefore, the period of time until printing is ended increases by an amount indicated by a reference numeral 581 relative to the nine sheets circulation in FIG. 5B.

FIG. 5E is a diagram illustrating the relationship between the number of sheets of double-sided circulation in the image forming apparatus 101 according to the first embodiment and the number of sheets that can be successively fed before starting paper refeeding.

"(The number of sheets that can be successively fed before starting paper refeeding)×2-1" is the number of sheets of double-sided circulation. In the example in FIG. 5A, the number of sheets of double-sided circulation is "9". The number of sheets of double-sided circulation changes according to the conveyance path of the image forming apparatus 101 and the size of sheet to be printed. Therefore, the value in FIG. 5E is an example according to the first embodiment. Also, in an overtaking double-sided control in FIG. 8, which will be described later, the number of sheets of double-sided circulation decreases relative to a normal double-sided control. In the first embodiment, the number of sheets of double-sided circulation of the normal double-sided control (hereinafter, abbreviate "normal double-sided") is nine, and the number of sheets of double-sided circulation of the overtaking double-sided control (hereinafter, abbreviate "overtaking double-sided") is five.

Figure 6A:
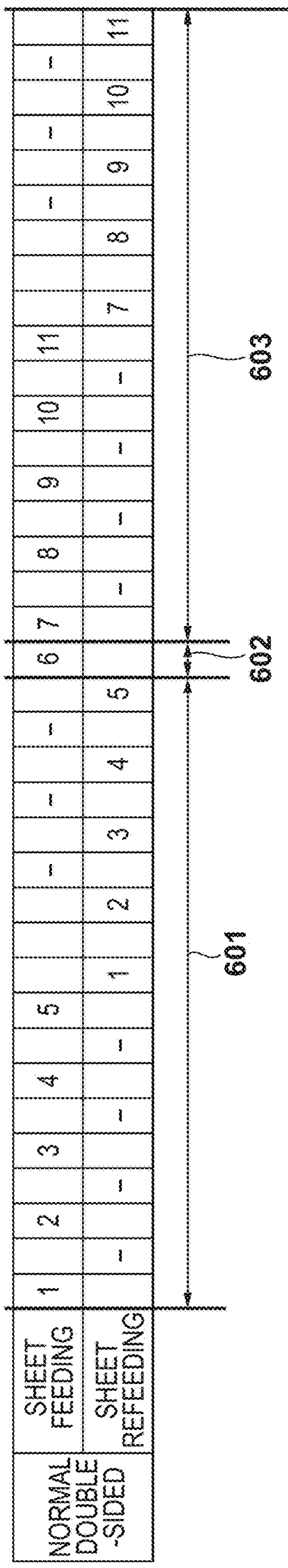
FIGS. 6A and 6B are diagrams illustrating an example of conveyance control in the image forming apparatus according to the first embodiment.
Figure 6B:
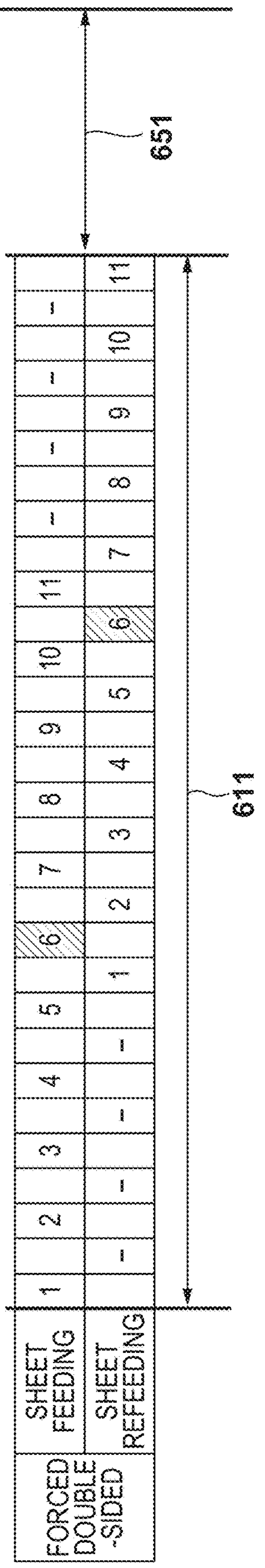

FIGS. 6A and 6B are diagrams illustrating an example of conveyance control in the image forming apparatus 101 according to the first embodiment. Here, the difference between the normal double-sided and the forced double-sided control (hereinafter, abbreviate "forced double-sided") is described. This is a diagram for describing a case where double-sided printing is performed on first to fifth sheets, single-sided printing is performed on a sixth sheet, and double-sided printing is performed on seventh to eleventh sheets.

FIG. 6A is a diagram showing a case of the normal double-sided. The normal double-sided is a control method of performing double-sided printing in which a sheet on which double-sided printing is to be performed is subjected to conveyance control of double-sided printing, and a sheet on which single-sided printing is to be performed is subjected to conveyance control of single-sided printing. That is, in double-sided printing, a sheet is conveyed by the conveyance rollers 403, 404, 405, 406, 408, 409, 410, 411, 412, 411, 415, 416, 417, 418, 419, 420, 403, 404, 405, 406, 407, and 421 shown in FIG. 4, in this order. Also, the sheet on which single-sided printing is to be performed is conveyed by the conveyance rollers 403, 404, 405, 406, 408, 409, 410, 411, 412, 411, 413, 414, and 421 shown in FIG. 4, in this order.

As shown in FIG. 6A, double-sided printing control is performed in a print range 601. That is, in order to perform single-sided printing in a print range 602, after performing double-sided printing on all of the first to fifth sheets, single-sided printing of the sixth sheet is performed. Then, after single-sided printing of the sixth sheet is performed in the single-sided printing range 602, in order to perform double-sided printing on the seventh to eleventh sheets, double-sided printing control is again performed in a double-sided printing range 603.

In this way, in the normal double-sided, it is necessary to, when switching from double-sided printing to single-sided printing is performed, switch to sheet conveyance control for single-sided printing, after once completing paper refeeding of sheets of double-sided printing (double-sided printing). Hereinafter, this switching operation is expressed as "double-sided circulation is interrupted".

FIG. 6B is a diagram for describing the forced double-sided. The forced double-sided is conveyance control in which double-sided printing is performed on a single-sided printing sheet as well while regarding the sheet as a double-sided printing sheet whose second side is blank. In FIG. 6B, although the sixth sheet is of single-sided printing, double-sided printing control is performed while deeming that its second side is a blank image. In the diagram, the sixth sheet is expressed by a hatched background. In the following, a single-sided printing sheet that is switched to the forced double-sided is expressed by a hatched background. According to this control, the double-sided circulation control can be continued with respect to all the sheets in a print range 611. Therefore, it can be understood that the period of time needed for printing is shortened in the forced double-sided relative to the normal double-sided by an amount corresponding to the number of sides of sheets indicated by a reference numeral 651.

Figures 7A, 7B, 7C:
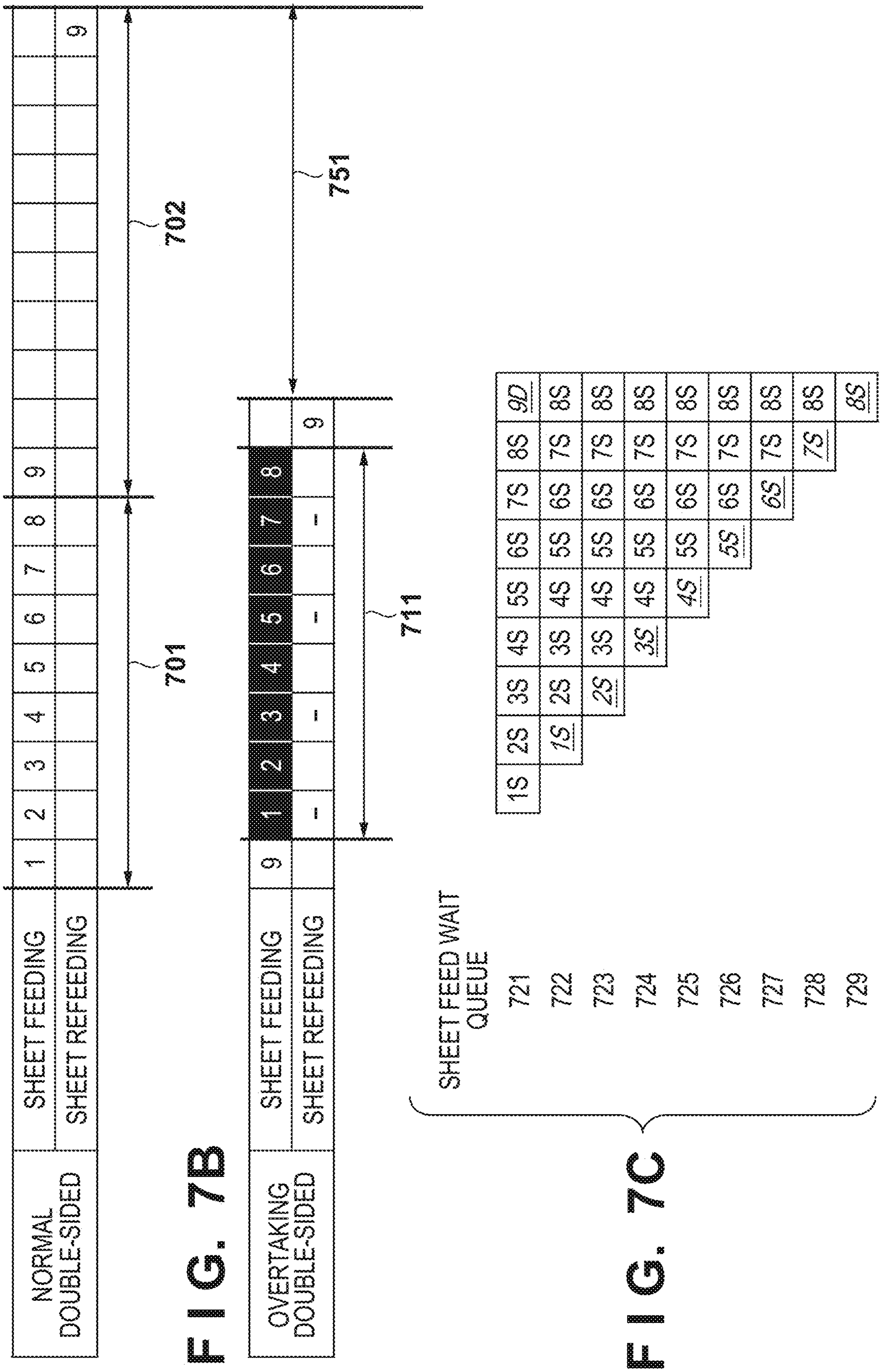
FIGS. 7A to 7C are diagrams illustrating an example of conveyance control in the image forming apparatus according to the first embodiment.

FIGS. 7A to 7C are diagrams illustrating an example of conveyance control in the image forming apparatus 101 according to the first embodiment. Here, the difference between the normal double-sided and the overtaking double-sided is described. This is a diagram for describing a case where single-sided printing is to be performed on first to eighth sheets, and double-sided printing is to be performed on a ninth single sheet.

FIG. 7A is a diagram for describing the normal double-sided. The single-sided printing is performed on the first to eighth sheets in a print range 701. Also, in a print range 702, double-sided printing is performed on the ninth sheet. In order to perform double-sided printing on one sheet in the print range 702, the sheet needs to be conveyed by a distance corresponding to length of the double-sided path in FIG. 4. Therefore, a vacant period corresponding thereto is incurred until a tenth sheet is fed. This vacant sheet interval is a cause of the increase in printing time.

FIG. 7B is a diagram for describing the overtaking double-sided. The overtaking double-sided is a control method generated from a concept that the vacant sheet interval from paper feeding until paper refeeding (print range 701) in the normal double-sided printing is wasteful. The overtaking double-sided is a control method in which, in printing in which double-sided printing is continuously performed after single-sided printing, a page that is a first side of the following double-sided printing is printed in advance to a page on which single-sided printing is performed, in an overtaking manner, and a printing of a page, which is of single-sided printing, is performed in a vacant sheet interval until printing is performed on the second side of the sheet of the double-sided printing.

That is, here, the ninth sheet that is a double-sided printing target subsequent to the first to eighth sheets that are single-sided printing targets is fed in advance to the single-sided printing, and printing is performed on the first side of the ninth sheet. Next, the single-sided printing is performed on the first to eighth sheets that are overtaken and on which single-sided printing is to be performed (print range 711). Thereafter, printing is performed on the second side of the ninth sheet whose first side has been printed. In FIG. 7B, the first to eighth sheets that are overtaken and are single-sided printing targets are expressed by white letters in a black background. In the following diagrams, the sheet of single-sided printing that is overtaken by the overtaking double-sided is expressed by a white letter in a black background. Note that the single-sided printing target sheet is specifically a sheet on which an image of a page regarding which single-sided printing is designated in a print job is to be printed. The double-sided printing target sheet is specifically a sheet on which an image of a page designated as a first side (second side) in double-sided printing in a print job is to be printed.

The control method of the overtaking double-sided will be described with reference to sheet feed wait queues 721 to 729 in FIG. 7C.

The sheet feed wait queue is a data structure on the RAM 306, and express a sheet to be fed from now. Here, a single-sided printing sheet or a double-sided printing sheet is added to the sheet feed wait queue in the printing order, and erased from the queue at the timing at which paper feeding is performed (regarding the case of double-sided printing, at the timing at which paper feeding is performed for printing on a first side (front surface) not for printing on a second side (back surface).

In the sheet feed wait queue 721, first to eighth sheets on which single-sided printing is to be performed are expressed by 1S to 8S, and a ninth sheet on which double-sided printing is to be performed is expressed by 9D. S and D here are suffixes expressing single-sided (Simplex) and double-sided (Duplex). In the overtaking double-sided, it is confirmed whether a sheet for double-sided printing is present in "number of sheets of double-sided circulation—1" sheets following the first sheet in the sheet feed wait queue. If such a sheet is present, the sheet on which double-sided printing is to be performed is fed first. In the sheet feed wait queue 721, sheets "2S, 3S, 4S, 5S, 6S, 7S, 8S, and 9D" are present as sheets following the sheet 1S. In the first embodiment, the number of sheets of double-sided circulation is nine, as described above, and therefore it is determined whether or not a double-sided printing sheet is present in 9−1=8 sheets from the sheet 2S. In the sheet feed wait queue 721, the sheet 9D is just present as the eighth sheet from the sheet 2S. Therefore, the sheet 9D is fed in advance to the sheet 1S. The sheet that is determined to be fed is expressed by (underline+ italic font) in each sheet feed wait queue. Note that a sheet waiting for being refed is not included in FIG. 7C. In the sheet feed wait queue 721, the sheet 9D is determined to be fed, and therefore is shown by "9D" in an underlined italic font. Then, in the sheet feed wait queues 722 to 729, paper feeding is performed in the order of sheets "1S, 2S, 3S, 4S, 5S, 6S, 7S, and 8S" that are respectively the first sheets in the sheet feed wait queues 722 to 729. With this, the period of time needed for printing in the overtaking double-sided is shortened by an amount corresponding to eight sides of sheets relative to the normal double-sided, as indicated by a reference numeral 751, and the performance becomes advantageous.

Figure 8:
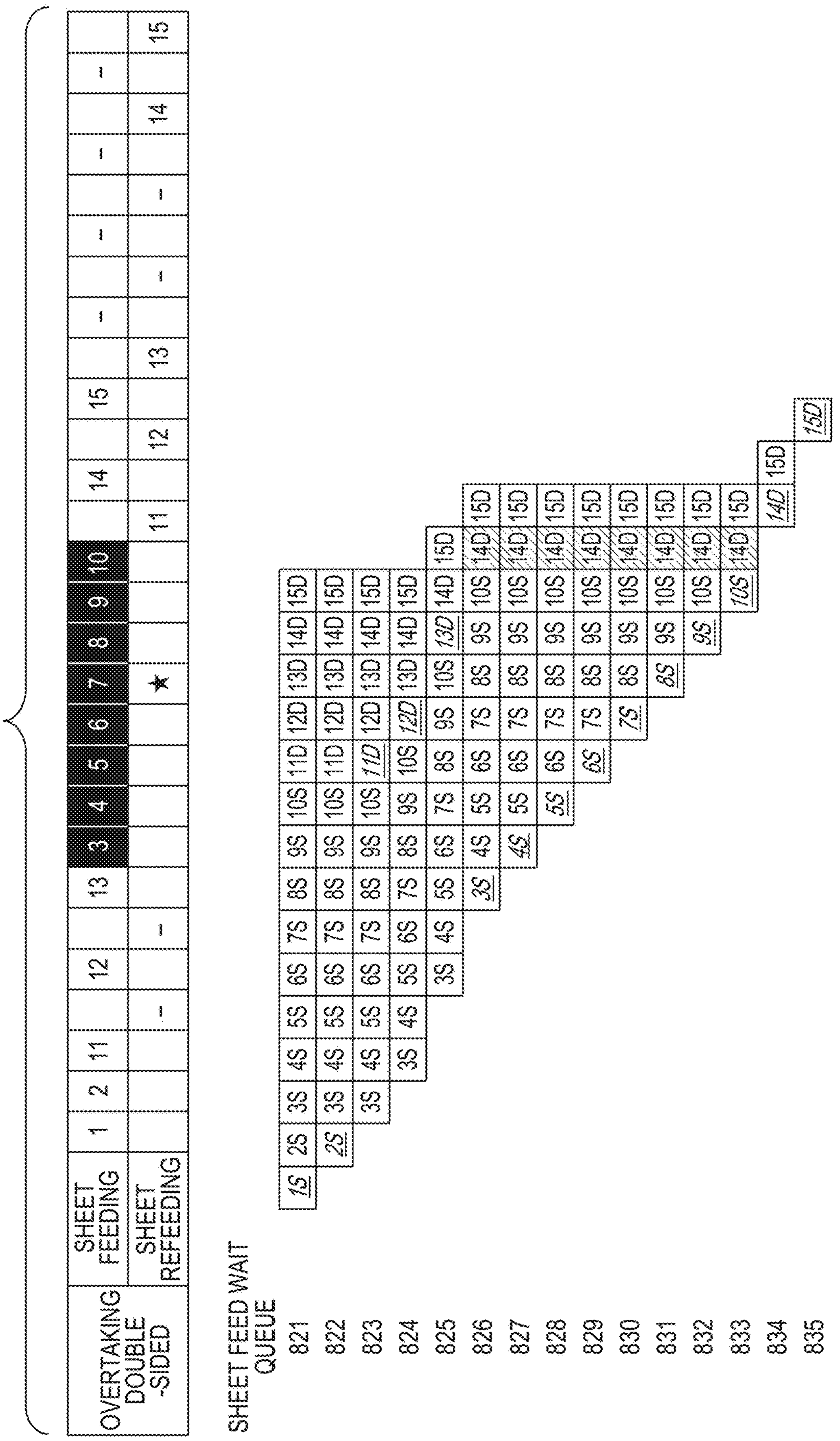
FIG. 8 is a diagram illustrating an example of conveyance control in the image forming apparatus according to the first embodiment.

FIG. 8 is a diagram illustrating an example of conveyance control in the image forming apparatus 101 according to the first embodiment. Here, this is a diagram for describing a case where single-sided printing is to be performed on first to tenth sheets, and double-sided printing is to be performed on eleventh to fifteenth sheets by the overtaking double-sided control.

In sheet feed wait queues 821 and 822, because a sheet for a double-sided printing is not present in eight sheets following sheets 1S and 2S, respectively, the sheets 1S and 2S are respectively fed and single-sided printing is executed. Next, in a sheet feed wait queue 823, because a sheet 11D on which double-sided printing is to be performed is present in eight sheets following the sheet 3S, the sheet 11D for following double-sided printing is fed firstly. Also, in a next sheet feed wait queue 824, the sheet 11D is fed in the sheet feed wait queue 823, 11D is erased from the sheet feed wait queue. Moreover, a sheet 12D of double-sided printing becomes present in eight sheets following the sheet 3S. Therefore, the sheet 12D of the following double-sided printing is precedingly fed. Also, in a sheet feed wait queue 825, similarly to the sheet feed wait queue 824, a sheet 13D of the following double-sided printing is precedingly fed.

Next, in a sheet feed wait queue 826, a sheet 14D of double-sided printing is present in eight sheets following the sheet 3S. However, as shown in FIG. 5A, at the time of the overtaking double-sided, a sheet of double-sided printing and a sheet of single-sided printing are mixed, and therefore, only the waiting positions 501, 502, and 503 can be used as the waiting positions for paper refeeding of sheets for double-sided printing. This is because a sheet of single-sided printing needs to be conveyed by the conveyance rollers 408, 409, 410, 411, 412, 411, 413, 414, and 421 in this order, in order to perform reverse discharging. If a sheet is caused to wait at the waiting position 504 or 505 for paper refeeding of a sheet for double-sided printing, collision occurs with a sheet that is reversed in single-sided printing, and jamming occurs. As a result, in the case of the overtaking double-sided, only three sheets can be precedingly fed, and the operation is substantially performed with the five sheets circulation. The description of the change in the number of sheets of double-sided circulation between the normal double-sided and the overtaking double-sided is as described above with reference to FIG. 5E. Therefore, here, three sheets have been precedingly fed in the sheet feed wait queues 823, 824, and 825, and because no more sheet for double-sided printing can be precedingly fed, the sheet 3S is fed. Here, the sheet 14D of double-sided printing that has not been precedingly fed is expressed by with hatch.

Similarly, in sheet feed wait queues 827 to 833, similarly to the sheet feed wait queue 826, the sheet 14D of double-sided printing is present in eight sheets following the first sheet. Because three sheets have been precedingly fed, the sheets 3S, 4S, 5S, 6S, 7S, 8S, 9S, and 10S that are first in the respective sheet feed wait queues are fed.

Then, after the sheet 10S of single-sided printing that is the tenth sheet in the sheet feed wait queue 833 has been fed, the sheet 11D that has been fed in the sheet feed wait queue 823 and is present in the waiting position 501 for double-sided printing is refed. Originally, the sheet 11D can be refed after nine sides of sheets after being fed. In FIG. 8, the point is expressed by an asterisk. However, at this point in time, the sheets 7S to 10S of single-sided printing that have been overtaken are not fed, and therefore the sheet 11D is to be fed after the sheet 10S is fed.

In a sheet feed wait queue 834, because the number of sheets of double-sided printing that have been precedingly fed becomes two, the sheet 14D is to be fed. After the sheet 14D is fed, and printing is performed on the first side of the sheet 14D, the sheet 12D is refed for performing printing on the second side of the sheet 12D, and the sheet 15D is fed in the sheet feed wait queue 835 for performing printing on the first side of the sheet 15D.

Next, the control method at the time of the overtaking double-sided control will be described with reference to the flowchart in FIG. 9.

Figure 9:
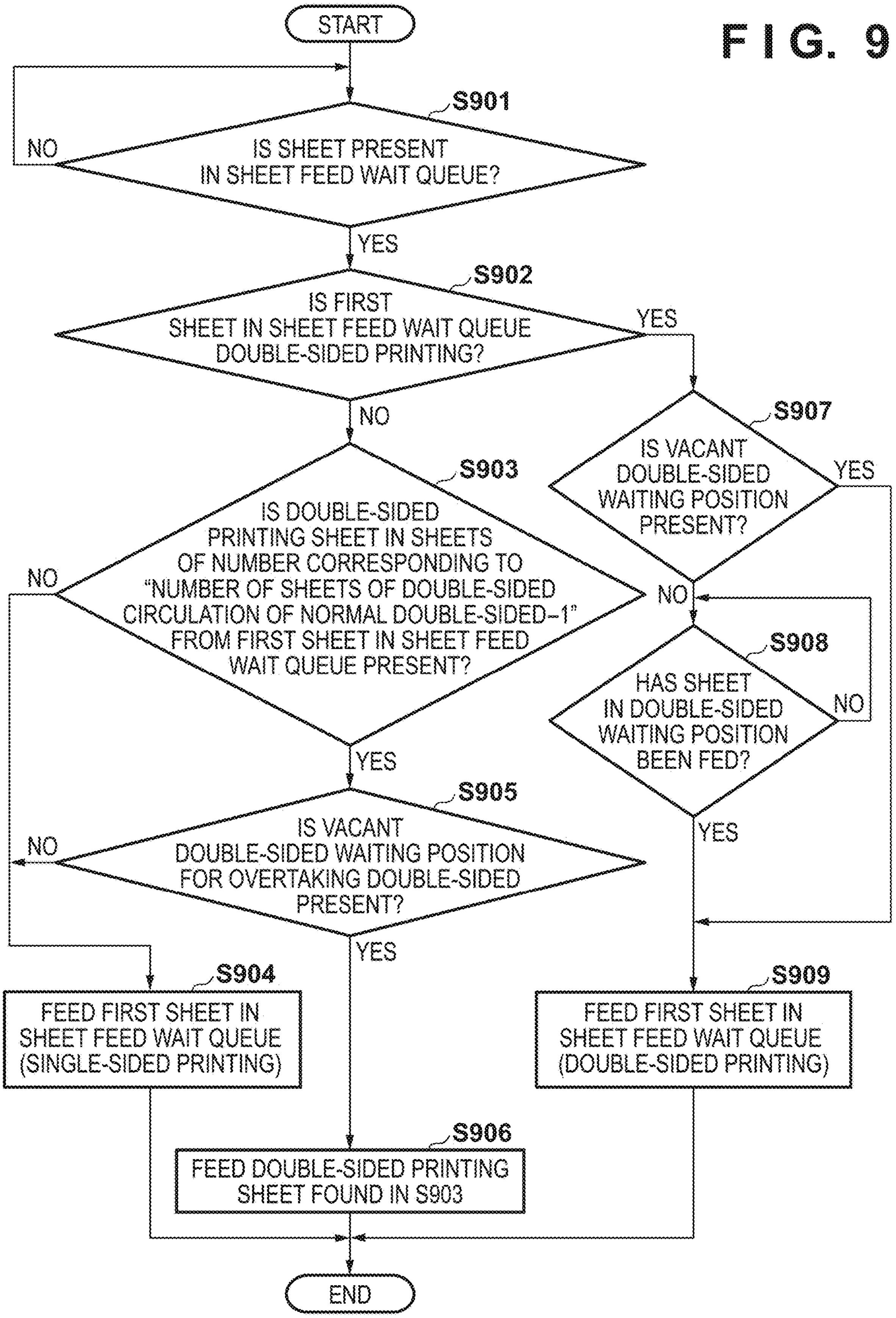
FIG. 9 is a flowchart for describing overtaking double-sided control in the image forming apparatus according to the first embodiment.

FIG. 9 is a flowchart for describing overtaking double-sided control in the image forming apparatus 101 according to the first embodiment. Note that the processing described in this flowchart is achieved by the CPU 305 executing a program deployed in the RAM 306.

First, in step S901, the CPU 305 determines whether or not a sheet is present in the sheet feed wait queue on the RAM 306. If it is determined that a sheet is present, the processing is advanced to step S902, and if not, the processing is returned to step S901, and a sheet waiting for paper feeding being registered is waited for. In step S902, the CPU 305 determines which of single-sided printing and double-sided printing is to be performed on the first sheet in the sheet feed wait queue. In the case of single-sided printing, the processing is advanced to step S903, and in the case of double-sided printing, the processing is advanced to step S907. In step S903, the CPU 305 determines whether or not a double-sided printing sheet is present in sheets of the number corresponding to "the number of sheets of double-sided circulation of the normal double-sided-1" from the sheet next to the first sheet in the sheet feed wait queue. Here, the number of sheets of double-sided circulation of the normal double-sided is nine, as shown in FIG. 5E, for example. Therefore, in step S903, the CPU 305 determines whether or not a double-sided printing sheet is present in sheets from the sheet next to the first sheet until the eighth sheet. In step S903, if the CPU 305 determines that a double-sided printing sheet is not present until the above-described eighth sheet, the processing is advanced to step S904, the first sheet in the sheet feed wait queue is fed, and this processing is ended.

On the other hand, in step S903, if the CPU 305 determines that a double-sided printing sheet is present until the above-described eighth sheet, the processing is advanced to step S905. In step S905, the CPU 305 determines whether or not a vacant double-sided waiting position for the overtaking double-sided is present. For example, in the example in FIG. 5E, at the time of the overtaking double-sided, the number of double-sided printing sheets that can be precedingly fed is three. If it is determined that a vacant double-sided waiting position for the overtaking double-sided is present, the processing is advanced to step S906, and if it is determined that a vacancy is not present, the processing is advanced to step S904, and the first single-sided printing sheet in the sheet feed wait queue is fed. In step S906, the CPU 305 feeds the double-sided printing sheet found in step S903 that is present after sheets of the (number of sheets of double-sided circulation −1) from the first sheet in the sheet feed wait queue, and ends this processing.

In step S907, the CPU 305 determines whether or not a vacant waiting position for a double-sided printing sheet is present. If it is determined that a vacancy is present, the processing is advanced to step S909, the CPU 305 feeds the first double-sided printing sheet in the sheet feed wait queue, and ends this processing. On the other hand, in step S907, if the CPU 305 has determined that a vacant waiting position is not present, the processing is advanced to step S908. In step S908, the CPU 305 determines whether or not a sheet in a double-sided waiting position has been fed, and if it is determined that a sheet in the double-sided waiting position has been fed, the processing is advanced to step S909, and if a sheet has not been not fed, the processing remains in step S908 until a sheet in the double-sided waiting position is fed.

In the sheet feed wait queues 821 and 822 in FIG. 8, the processing is executed in the order from step S901 to step S902, step S903, and step S904, in FIG. 9, and the first single-sided printing sheet in the sheet feed wait queue is fed.

In the sheet feed wait queues 823, 824, and 825 in FIG. 8, the processing is executed in the order from step S901 to step S902, step S903, step S905, and step S906, in FIG. 9, and the double-sided printing sheet found in step S903 is fed instead of the first sheet in the sheet feed wait queue.

In the sheet feed wait queues 826 to 833 in FIG. 8, the processing is executed in the order from step S901 to step S902, step S903, step S905, and step S904, and the first sheet in the sheet feed wait queue is fed.

In the sheet feed wait queues 834 and 835 in FIG. 8, the processing is executed in the order from step S901 to step S902, step S907, and step S909, or in the order from step S901 to step S902, step S907, step S908, and step S909, and the first double-sided printing sheet in the sheet feed wait queue is fed.

Figure 10A:
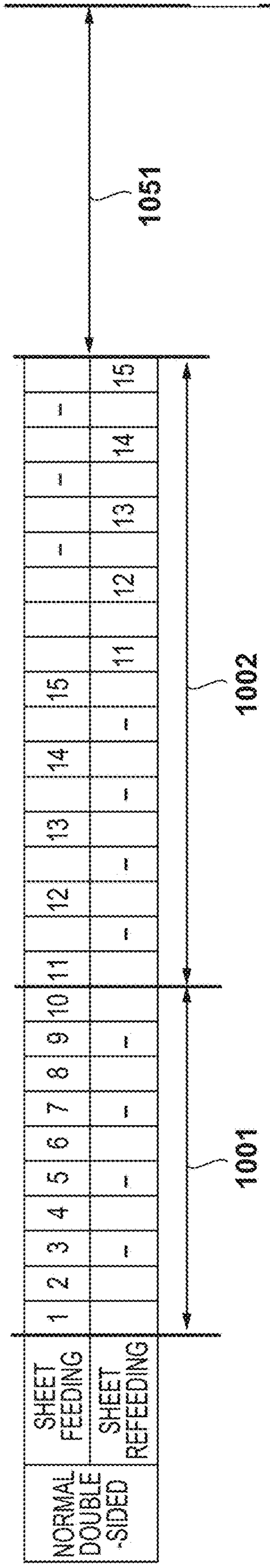
FIGS. 10A and 10B are diagrams illustrating an example of conveyance control in the image forming apparatus according to the first embodiment.
Figure 10B:
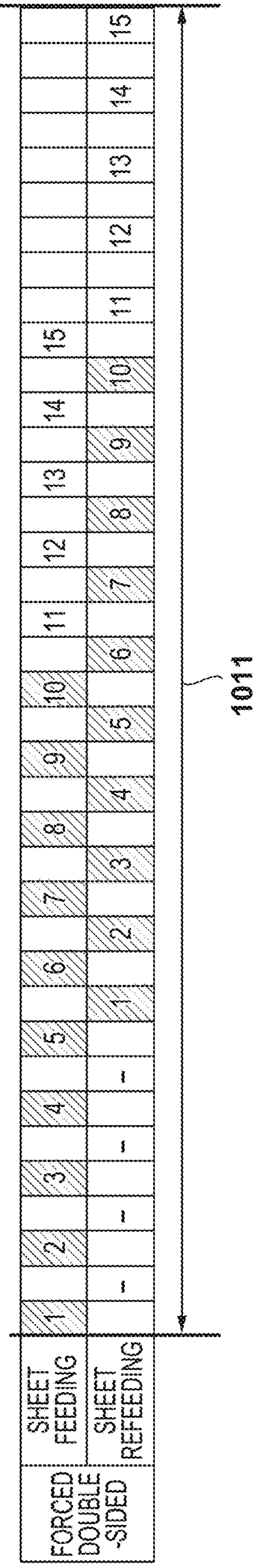

FIGS. 10A and 10B are diagrams illustrating an example of conveyance control in the image forming apparatus 101 according to the first embodiment. Here, the normal double-sided and the forced double-sided are respectively illustrated in the case where, similarly to FIG. 8, single-sided printing is to be performed on the first to tenth sheets, and double-sided printing is to be performed on the eleventh to fifteenth sheets. The overtaking double-sided has been described with reference to FIG. 8, and therefore the description thereof is omitted.

FIG. 10A shows a case of the normal double-sided, and in a print range 1001, the first to tenth sheets (1 to 10) are fed and single-sided printing is performed thereon. Next, in a print range 1002, the next eleventh to fifteenth sheets (11 to 15) are fed with the nine sheets circulation (five sheets are precedingly fed) and double-sided printing is performed thereon.

FIG. 10B shows a case of the forced double-sided, and the first to tenth sheets (1 to 10) that are single-sided printing targets are conveyed in the double-sided path after single-sided printing has been performed. That is, in a print range 1011, control is performed such that ten sheets (1 to 10) that are single-sided printing targets and five sheets (11 to 15) that are double-sided printing targets are successively subjected to double-sided printing with the nine sheets circulation.

The forced double-sided is aimed at improving performance by causing the double-sided circulation to be not interrupted as a result of causing a single-sided printing sheet that is present between sheets that are double-sided printing targets to be conveyed in the double-sided path after single-sided printing is performed. Note that the double-sided printing target sheet is a sheet on which images regarding which double-sided printing is instructed to be performed in a print job should be printed. Similarly, the single-sided printing target sheet is a sheet on which an image regarding which single-sided printing is instructed to be performed in a print job should be printed. When single-sided printing target sheets are successively present from the head of a print job, as shown in FIG. 10B, the sheets are caused to wastefully pass through the double-sided path, and therefore the performance degrades. In the examples in FIGS. 10A and 10B, it can be understood that paper feeding of sheets is completed earlier in the normal double-sided relative to the forced double-sided in an amount corresponding to ten sides of sheets, as indicated by a reference numeral 1051.

Figures 11A, 11B:
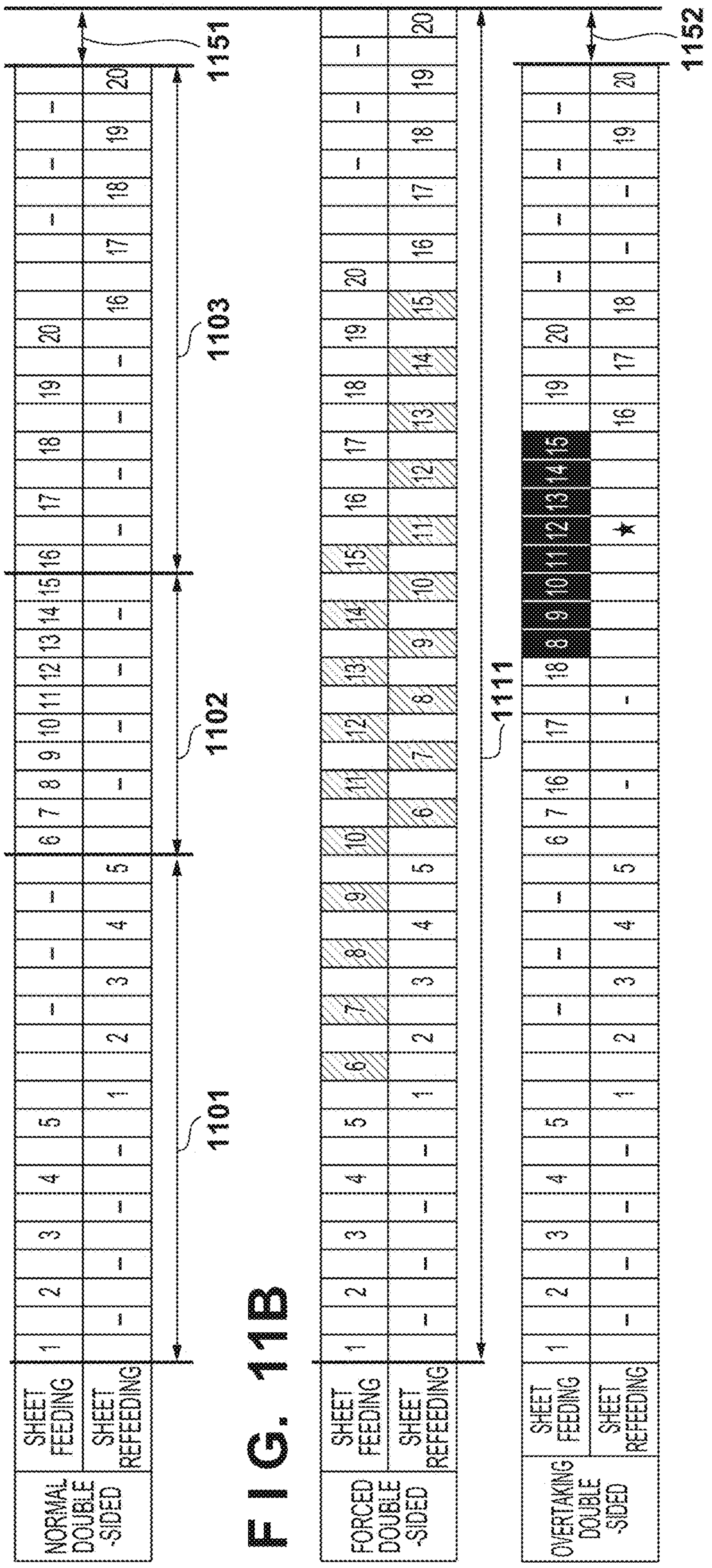
FIGS. 11A to 11C are diagrams illustrating an example of conveyance control in the image forming apparatus according to the first embodiment.
Figure 11C:
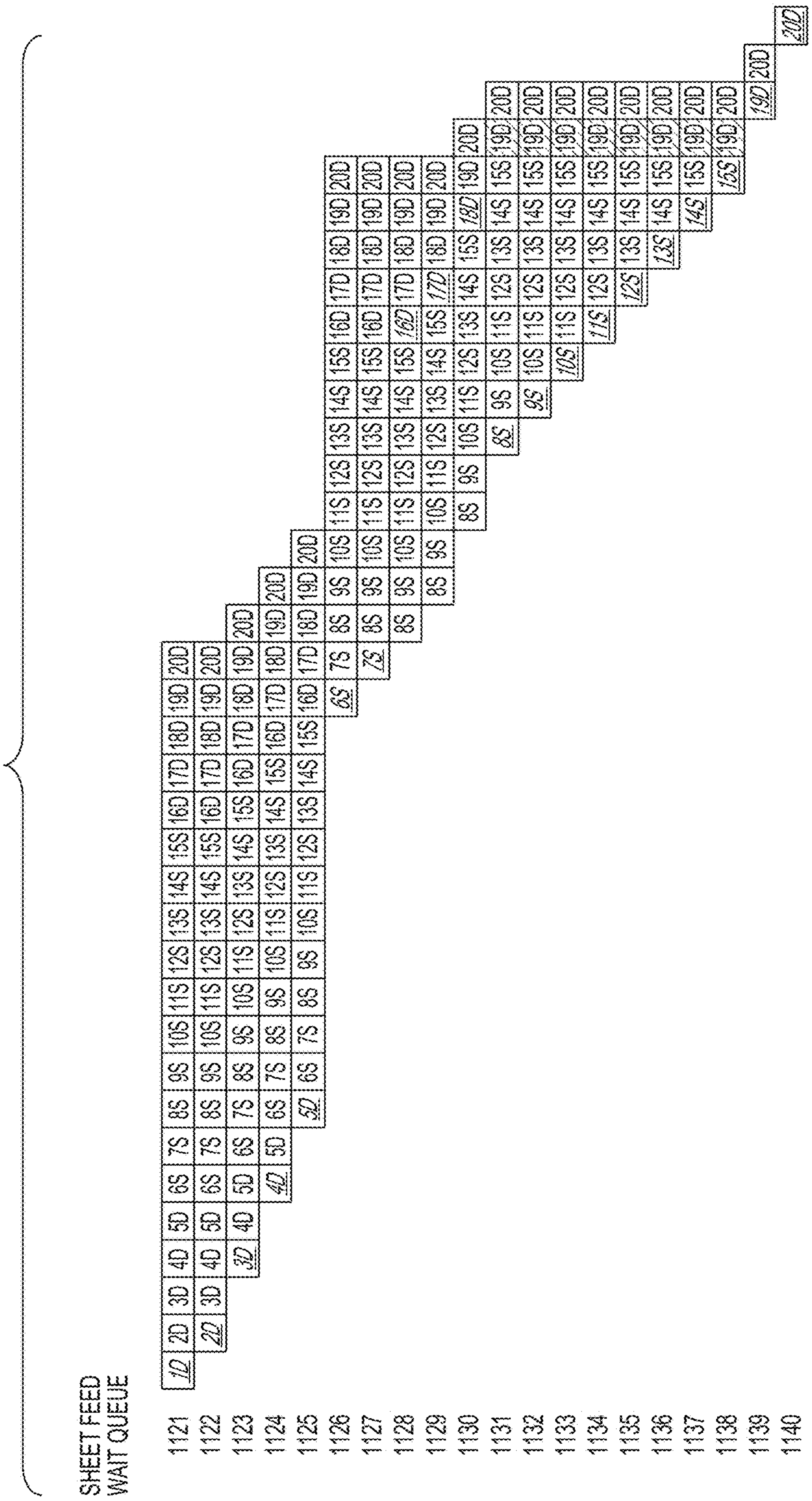

FIGS. 11A to 11C are diagrams illustrating an example of conveyance control in the image forming apparatus 101 according to the first embodiment. Here, the diagrams are respectively describing the normal double-sided, the forced double-sided, and the overtaking double-sided when the first to fifth sheets are double-sided printing target sheets, sixth to fifteenth sheets are single-sided printing target sheets, and sixteenth to twentieth sheets are double-sided printing target sheets.

FIG. 11A illustrates the normal double-sided, and double-sided printing is performed on five double-sided printing target sheets (1 to 5) with the nine sheets circulation in a print range 1101. Next, in a print range 1102, single-sided printing is performed on front surfaces of ten single-sided printing target sheets (6 to 15). Then, in a print range 1103, double-sided printing is performed on five double-sided printing target sheets (16 to 20) with the nine sheets circulation.

FIG. 11B illustrates the forced double-sided, and the ten single-sided printing target sheets (6 to 15) are conveyed on the double-sided path after single-sided printing is performed. That is, in a print range 1111, double-sided printing is successively performed, with the nine sheets circulation, on the five double-sided printing target sheets (1 to 5), the ten single-sided printing target sheets (6 to 15), and five double-sided printing target sheets (16 to 20).

FIG. 11C illustrates the overtaking double-sided, and in sheet feed wait queues 1121 to 1125, the processing is executed in the flow sequence from step S901 to step S902, step S907, and step S909 in the flowchart in FIG. 9, and the first double-sided printing sheet in the sheet feed wait queue is fed.

In sheet feed wait queues 1126 and 1127, the processing is executed in the order from step S901 to step S902, step S903, and step S904, and the single-sided printing target sheets 6S and 7S at the head in the respective sheet feed wait queues are fed. In sheet feed wait queues 1128 to 1130, the processing is executed in the order from step S901 to step S902, step S903, step S905, and step S906, and double-sided printing target sheets 16D, 17D, and 18D that are found in step S903 are fed, instead of the first sheet in each sheet feed wait queue.

In sheet feed wait queues 1131 to 1138, the processing is executed in the order from step S901 to step S902, step S903, step S905, and step S904, and single-sided printing target sheets 8S to 15S at the head in the respective sheet feed wait queues are fed.

In sheet feed wait queues 1139 and 1140, the processing is executed in the order from step S901 to step S902, step S907, and step S909, or in the order from step S901 to step S902, step S907, step S908, and step S909, and double-sided printing target sheets 19D and 20D at the head in the respective sheet feed wait queues are fed.

When comparison is made regarding performance between the normal double-sided, forced double-sided, and overtaking double-sided described above, as indicated by reference numerals 1151 and 1152, the normal double-sided and the overtaking double-sided are better relative to the forced double-sided in performance in an amount corresponding to two sides of sheets.

In FIGS. 10A and 10B, in the forced double-sided, the double-sided circulation is caused to continue by causing a single-sided printing target sheet that is present between double-sided printing target sheets to be conveyed on the double-sided path after single-sided printing is performed. It has been described that, with this, improvement of performance is aimed at. However, as shown in FIGS. 11A to 11C, even if a plurality of single-sided printing target sheets are successively present between double-sided printing target sheets, if the number of single-sided printing target sheets is larger than a predetermined number of sheets, a demerit is incurred by forcibly conveying the single-sided printing target sheets on the double-sided path after single-sided printing is performed.

Figures 12A, 12B:
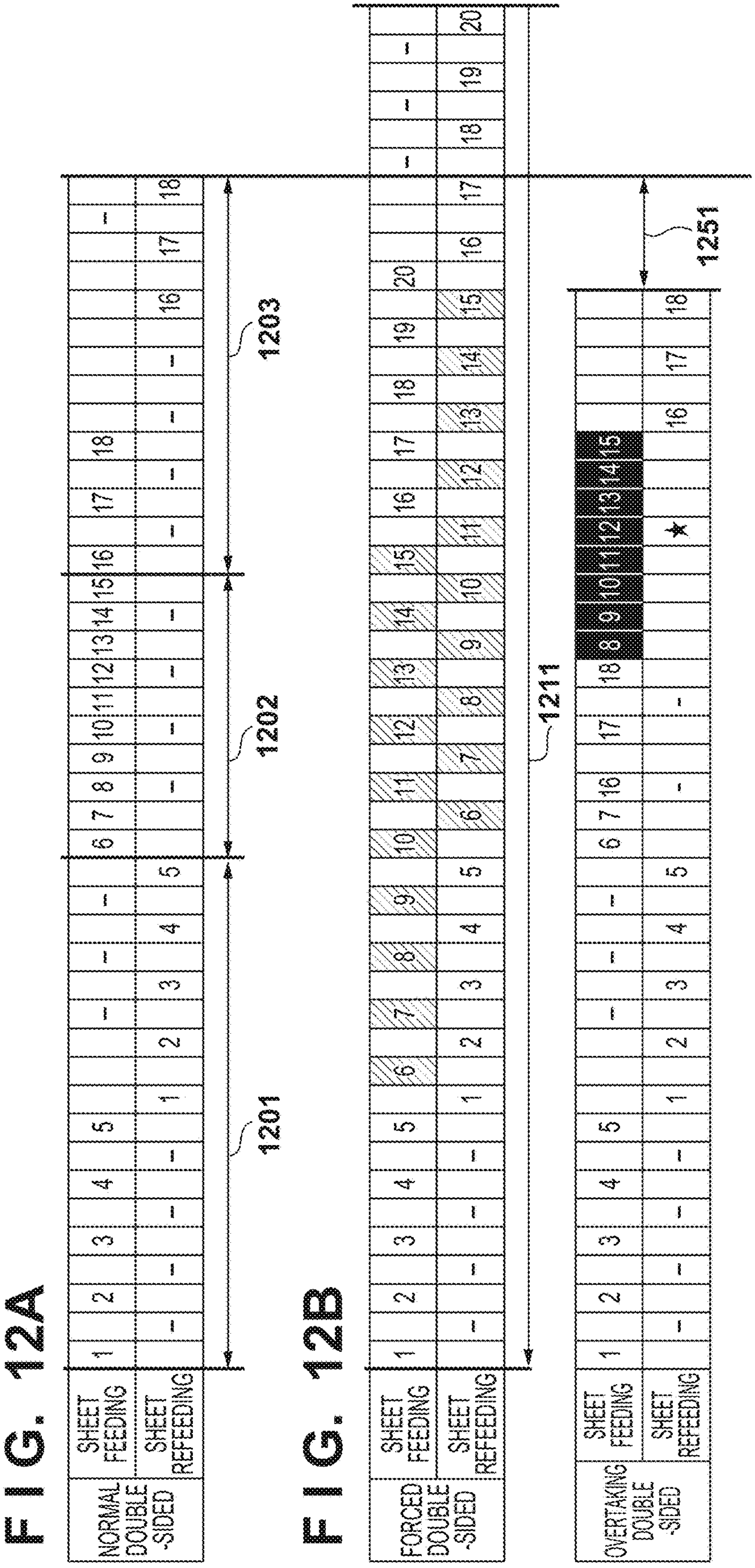
FIGS. 12A to 12C are diagrams illustrating an example of conveyance control in the image forming apparatus according to the first embodiment.
Figure 12C:
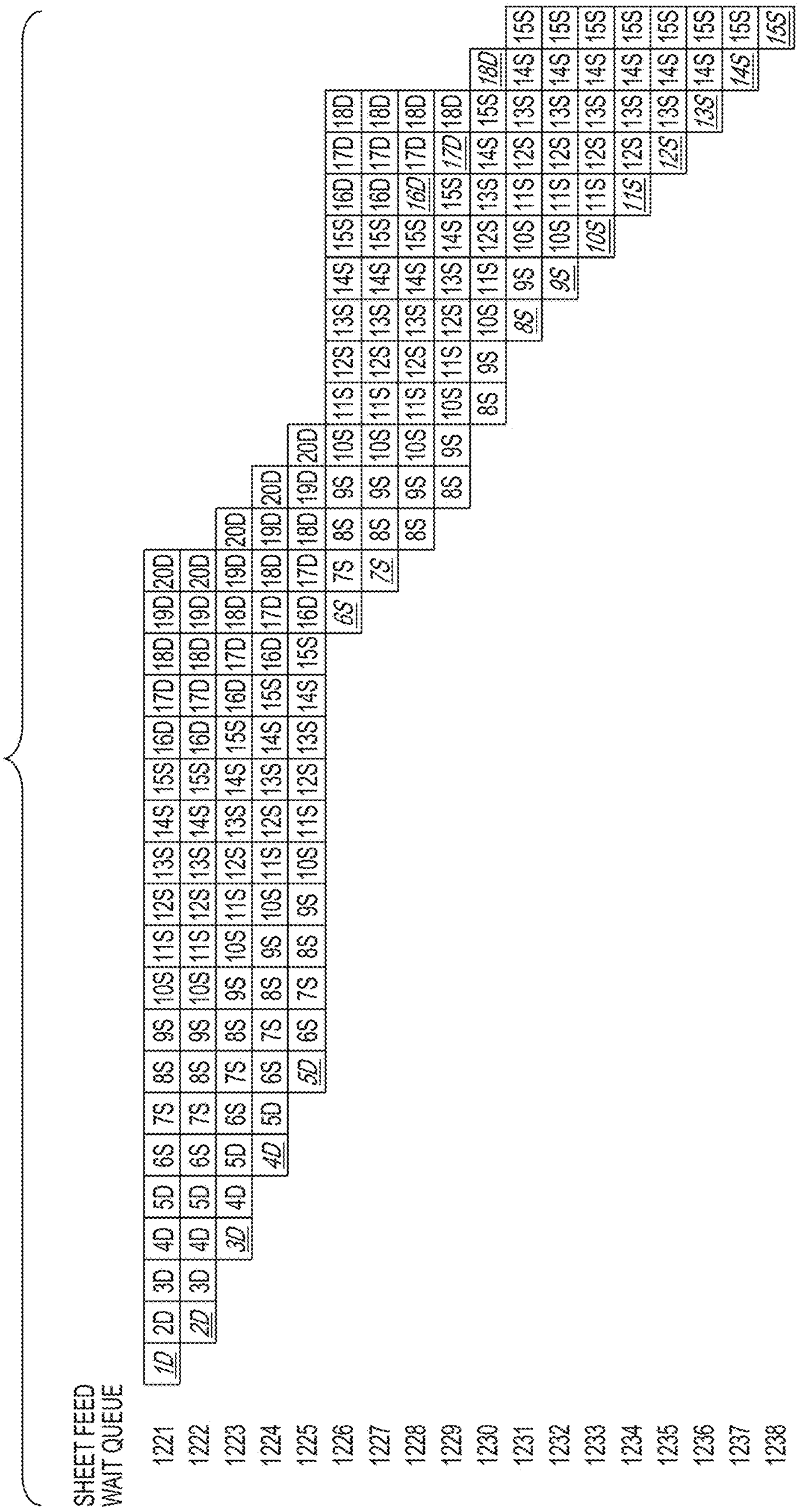

FIGS. 12A to 12C are diagrams illustrating an example of conveyance control in the image forming apparatus 101 according to the first embodiment. Here, the diagrams are respectively describing the normal double-sided, the forced double-sided, and the overtaking double-sided when the first to fifth sheets are double-sided printing target sheets, sixth to fifteenth sheets are single-sided printing target sheets, and sixteenth to eighteenth sheets are double-sided printing target sheets.

FIG. 12A illustrates the normal double-sided, and in a print range 1201, double-sided printing is performed on five double-sided printing target sheets (1 to 5) with the nine sheets circulation. Next, in a print range 1202, single-sided printing is performed on ten single-sided printing target sheets (6 to 15). Also, in a print range 1203, double-sided printing is performed on three double-sided printing target sheets (16 to 18) with the nine sheets circulation.

FIG. 12B illustrates the forced double-sided. Here, in a print range 1211, the sixth to fifteenth single-sided printing target sheets (6 to 15) are conveyed on the double-sided path after single-sided printing is performed. With this, double-sided printing is performed on the five double-sided printing target sheets (1 to 5), the ten single-sided printing target sheets (6 to 15), and the three double-sided printing target sheets (16 to 18) with the nine sheets circulation.

FIG. 12C illustrates the overtaking double-sided. In sheet feed wait queues 1221 to 1225, the processing is executed in the order from step S901 to step S902, step S907, and step S909 in the flowchart in FIG. 9, and the first double-sided printing target sheet in each sheet feed wait queue is fed, and printing is performed on both sides of the sheet.

In sheet feed wait queues 1226 and 1227, the processing is executed in the order from step S901 to step S902, step S903, and step S904, and single-sided printing target sheets 6S and 7S at the head in the respective sheet feed wait queues are fed, and printing is performed on the first sides thereof. In sheet feed wait queues 1228 to 1230, the processing is executed in the order from step S901 to step S902, step S903, step S905, and step S906, the double-sided printing target sheets 16D to 18D that were found in step S903 are fed, instead of the first sheet in the sheet feed wait queues 1228-1230, and printing is performed on the first sides thereof.

Then, in sheet feed wait queues 1231 to 1238, the processing is executed in the order from step S901 to step S902, step S903, step S905, and step S904, the single-sided printing target sheets 8S to 15S at the head in the respective sheet feed wait queues 1231-1238 are fed, and printing is performed on the first sides thereof.

In the example in FIGS. 11A to 11C, the performance is the same between the normal double-sided and the overtaking double-sided, but in the example in FIGS. 12A to 12C, it can be understood that the performance is better in the overtaking double-sided relative to the normal double-sided in an amount corresponding to four sides of sheets, as indicated by a reference numeral 1251. The difference in performance between the example in FIGS. 11A to 11C and the example in FIGS. 12A to 12C is caused by the difference in the number of double-sided printing target sheets that follow the ten single-sided printing target sheets (6 to 15). That is, in contrast to the number of double-sided printing target sheets that follow the single-sided printing target sheets is five (16 to 20) in the example in FIGS. 11A to 11C, the number is reduced to three (16 to 18) in the example in FIGS. 12A to 12C.

In the overtaking double-sided, the number of sheets of double-sided circulation is five, therefore the number of double-sided printing target sheets that can be fed precedingly to the single-sided printing is three. The overtaking double-sided is advantageous if the number of double-sided printing target sheets that can be precedingly fed is three or less. This is because, if the number of successive double-sided printing target sheets is larger than three, only the double-sided printing target sheets that are not precedingly fed are conveyed on the double-sided path after the double-sided printing target sheets that were precedingly fed have been refed. These sheets correspond to the sheets 19D and 20D in FIGS. 11A to 11C.

Figure 13A:
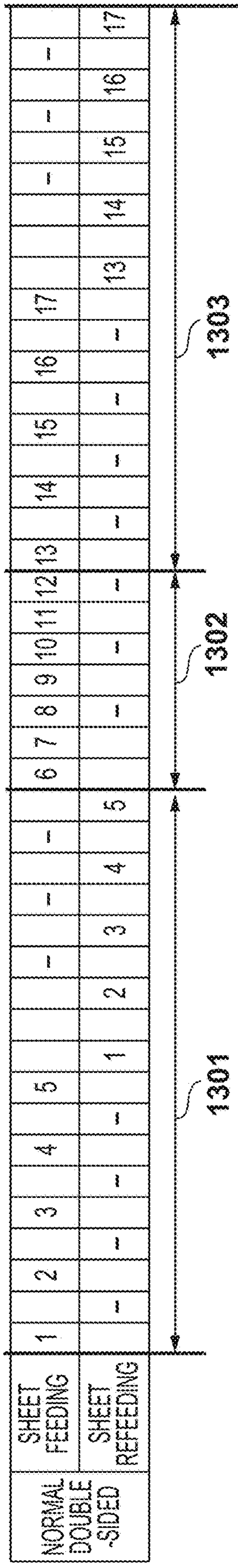
FIGS. 13A to 13C are diagrams illustrating an example of conveyance control in the image forming apparatus according to the first embodiment.
Figure 13B:
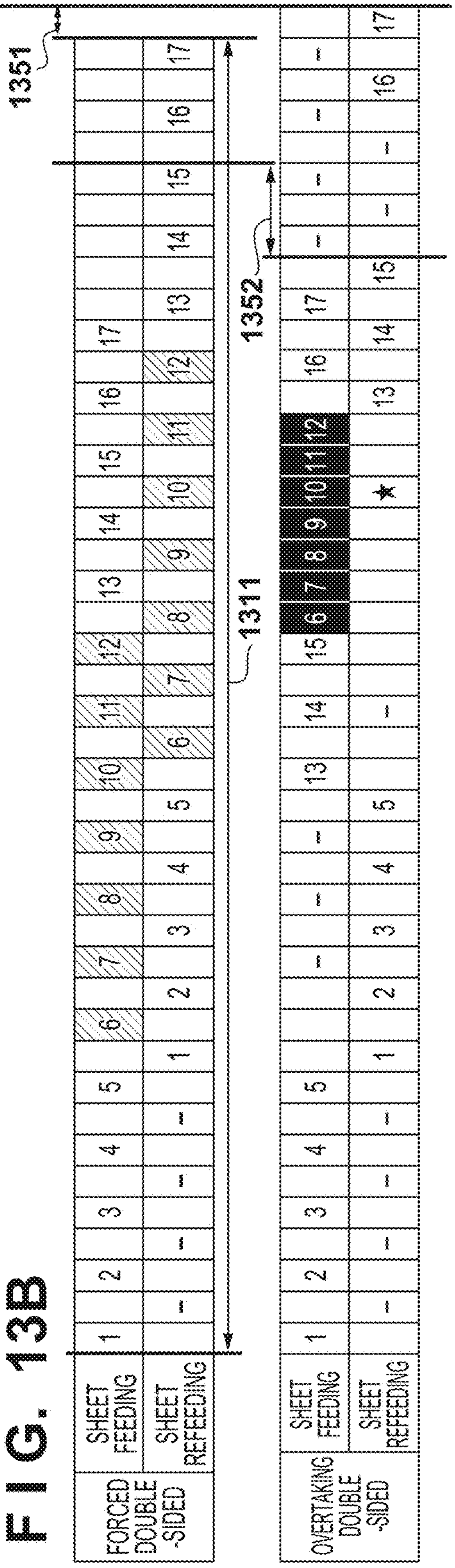
Figure 13C:
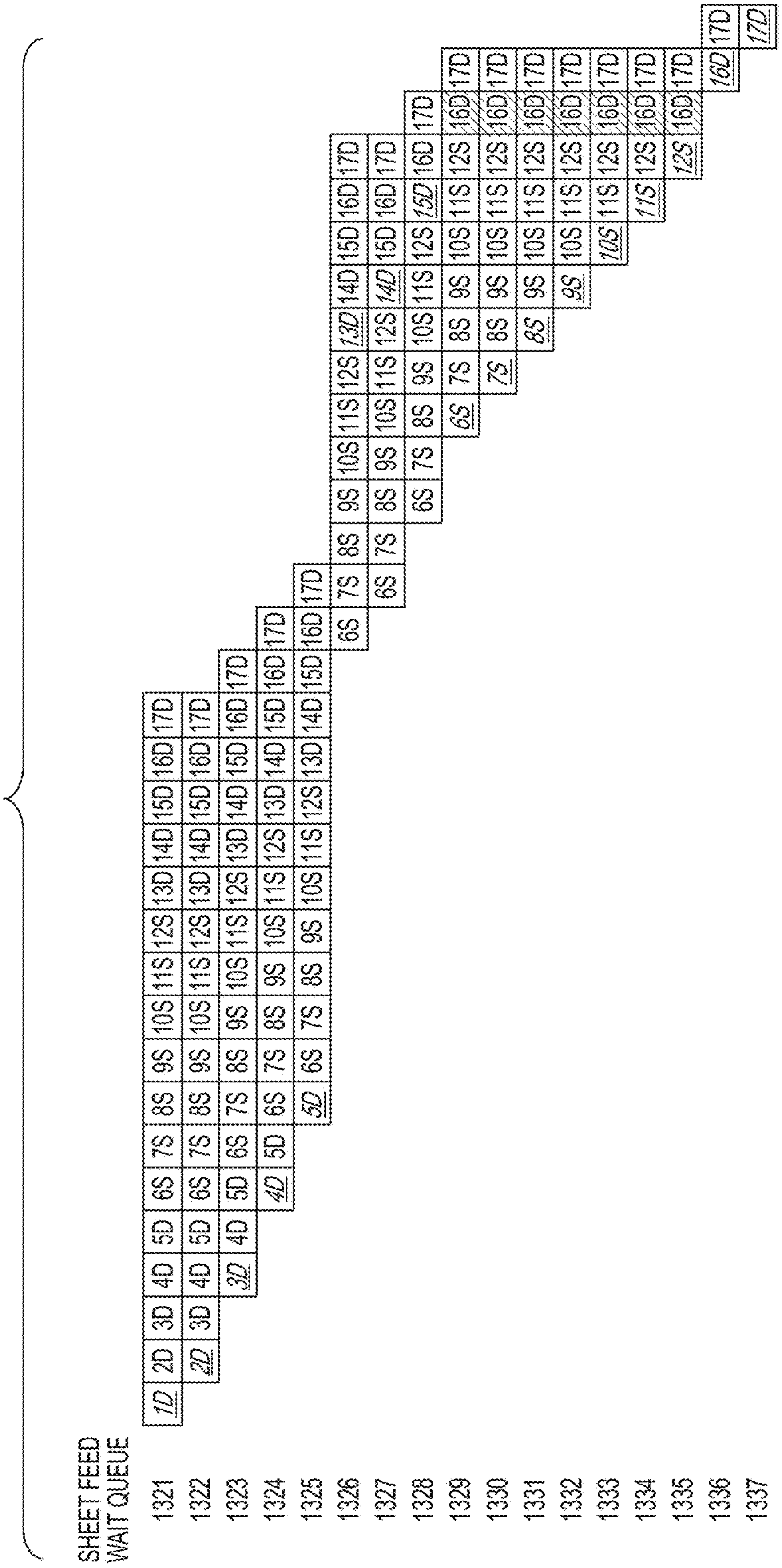

FIGS. 13A to 13C are diagrams illustrating an example of conveyance control in the image forming apparatus 101 according to the first embodiment. Here, the diagrams are respectively describing the normal double-sided, the forced double-sided, and the overtaking double-sided when the first to fifth sheets are double-sided printing target sheets, sixth to twelfth sheets are single-sided printing target sheets, and thirteenth to seventeenth sheets are double-sided printing target sheets.

FIG. 13A illustrates the normal double-sided, and in a print range 1301, double-sided printing is performed on five double-sided printing target sheets (1 to 5) with the nine sheets circulation. Then, in a print range 1302, single-sided printing is performed on sixth to twelfth single-sided printing target sheets (6 to 12), and double-sided printing is performed on thirteenth to seventeenth double-sided printing target sheets (13 to 17) with the nine sheets circulation, in a print range 1303.

FIG. 13B illustrates the forced double-sided, and the seven sixth to twelfth single-sided printing target sheets (6 to 12) are conveyed on the double-sided path after single-sided printing is performed. That is, in a print range 1311, double-sided printing is successively performed on the five double-sided printing target sheets (1 to 5), the seven single-sided printing target sheets (6 to 12), and the five double-sided printing target sheets (13 to 17) with the nine sheets circulation.

FIG. 13C illustrates the overtaking double-sided, and in sheet feed wait queues 1321 to 1325, the processing is executed in the order from step S901 to step S902, step S907, and step S909 in the flowchart in FIG. 9, the double-sided printing sheets 1D to 5D that are at the head in the respective sheet feed wait queues 1321-1325 are fed, and double-sided printing is performed thereon.

In sheet feed wait queues 1326 to 1328, the processing is executed in the order from step S901 to step S902, step S903, step S905, and step S906, and double-sided printing sheets 13D, 14D, and 15D that were found in step S903 are fed, instead of the first sheet in each sheet feed wait queue.

In sheet feed wait queues 1329 to 1335, the processing is executed in the order from step S901 to step S902, step S903, step S905, and step S904, and single-sided printing sheets 6S to 12S at the head in the respective sheet feed wait queues 1329-1335 are fed, and printing is performed on the front surfaces thereof.

Then, in sheet feed wait queues 1336 to 1337, the processing is executed in the order from step S901 to step S902, step S907, and step S909, or in the order from step S901 to step S902, step S907, step S908, and step S909, and double-sided printing target sheets 16D and 17D at the head in the respective sheet feed wait queues 1336 and 1337 are fed.

In FIGS. 11A to 11C and FIGS. 12A to 12C, it has been described that, if the number of single-sided printing target sheets that are successively present between double-sided printing target sheets is larger than a predetermined number of sheets, the performance of the forced double-sided becomes disadvantageous.

In contrast, in FIG. 13A to 13C, it is described that, if the number of single-sided printing target sheets that are successively present between two double-sided printing target sheet bundles is less than "the number of sheets of double-sided circulation of the normal double-sided −1 (here, 8, for example)", which is a threshold value, the forced double-sided or the overtaking double-sided becomes advantageous relative to the normal double-sided. The fact that "the number of sheets of double-sided circulation of the normal double-sided −1" is the threshold value is also described in the aforementioned Japanese Patent Laid-Open No. 2018-176562. In the example in FIG. 13A to 13C, the number of single-sided printing target sheets that are successively present between double-sided printing target sheets is "7", and is less than "8". With this, it can be understood that the performance is better in the forced double-sided relative to the normal double-sided in an amount corresponding to one side of sheet, as indicated by a reference numeral 1351, for example.

Moreover, as shown in FIGS. 12A to 12C, when a case is considered where the number of double-sided printing target sheets that are successive after the single-sided printing target sheets is three, the overtaking double-sided is advantageous relative to the forced double-sided. If the number of double-sided printing target sheets after the seven single-sided printing target sheets (6 to 12) is three (13 to 15), the performance of the overtaking double-sided is better relative to the forced double-sided in an amount corresponding to three sides of sheets, as indicated by a reference numeral 1352.

Figure 14A:
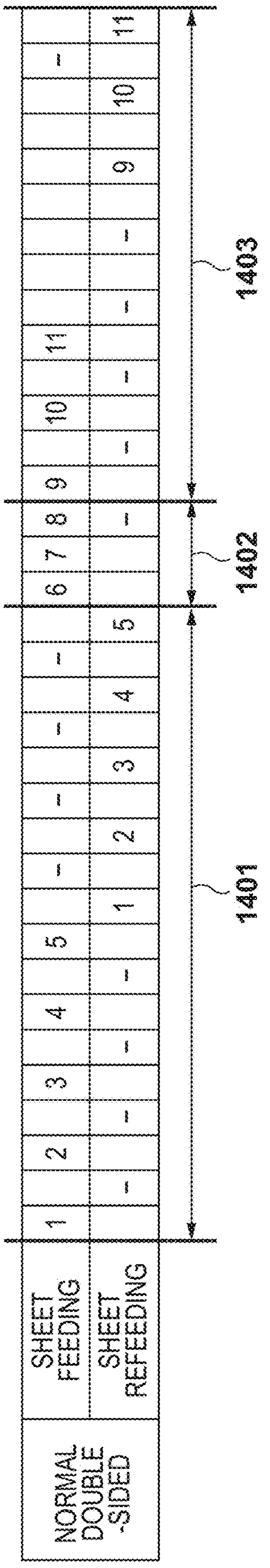
FIGS. 14A to 14C are diagrams illustrating an example of conveyance control in the image forming apparatus according to the first embodiment.
Figure 14B:
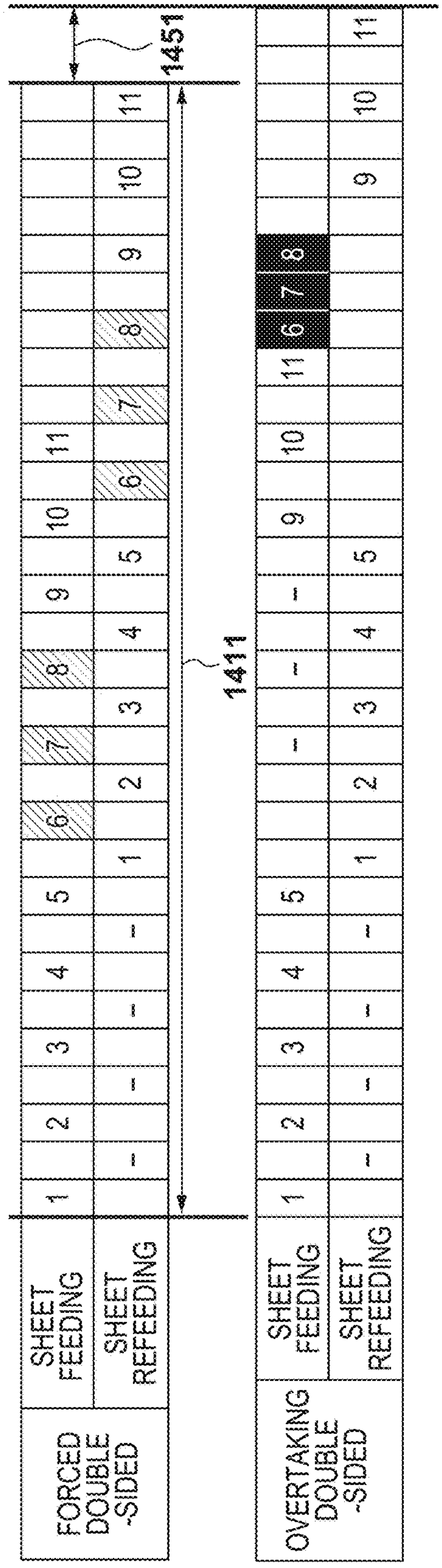
Figure 14C:
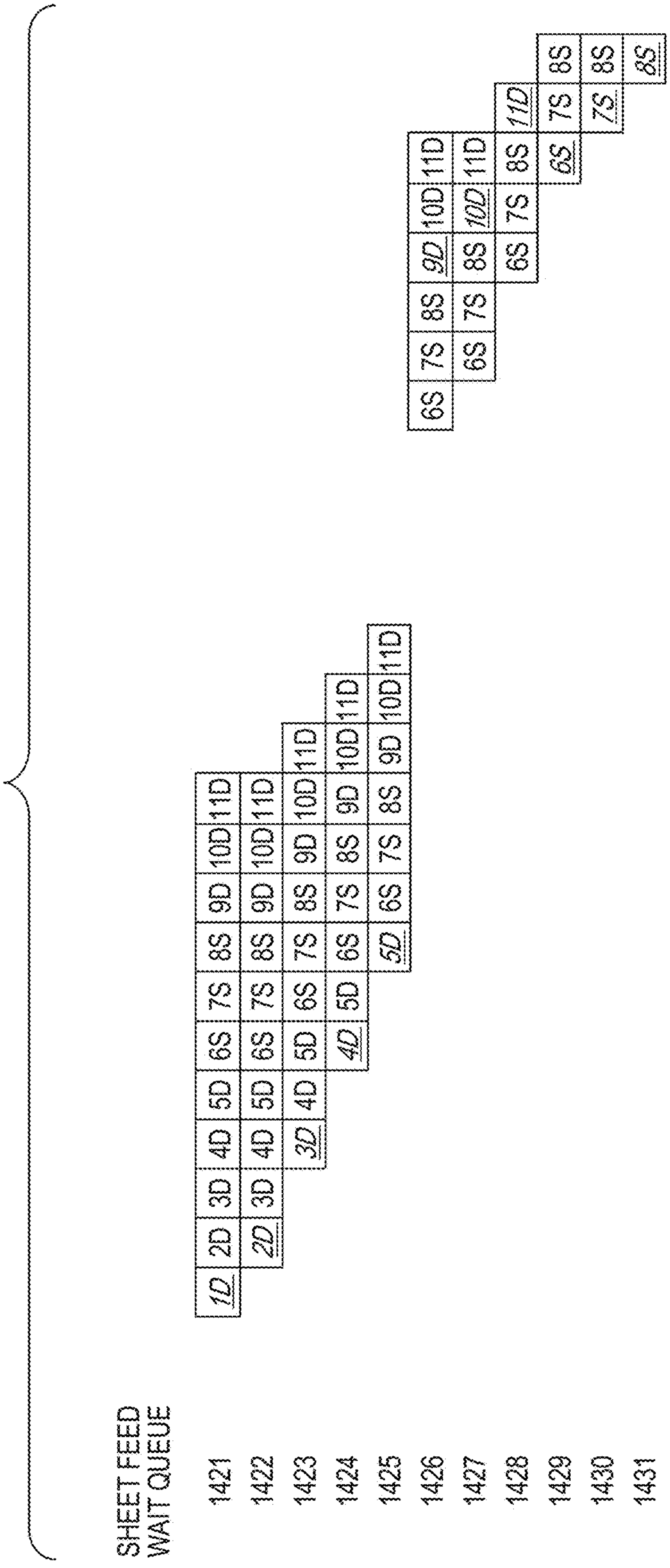

FIGS. 14A to 14C are diagrams illustrating an example of conveyance control in the image forming apparatus 101 according to the first embodiment. Here, the diagrams are respectively describing the normal double-sided, the forced double-sided, and the overtaking double-sided when the first to fifth sheets are double-sided printing target sheets, sixth to eighth sheets are single-sided printing target sheets, and ninth to eleventh sheets are double-sided printing target sheets.

FIG. 14A illustrates the normal double-sided, and double-sided printing is performed on five double-sided printing target sheets (1 to 5) with the nine sheets circulation in a print range 1401. Next, single-sided printing is performed on three single-sided printing target sheets (6 to 8) in a print range 1402. Next, double-sided printing is performed on three double-sided printing target sheets (9 to 11) with the nine sheets circulation in a print range 1403.

FIG. 14B illustrates the forced double-sided, double-sided printing is successively performed on the five double-sided printing target sheets (1 to 5), the three single-sided printing target sheets (6 to 8), and the three double-sided printing target sheets (9 to 11) with the nine sheets circulation in a print range 1411.

FIG. 14C illustrates the overtaking double-sided. In feed wait queues 1421 to 1425, the processing is performed in the order from step S901 to step S902, step S907, and step S909 in the flowchart in FIG. 9, and double-sided printing is performed on the five double-sided printing target sheets 1D to 5D at the head in the respective sheet feed wait queues 1421-1425.

In sheet feed wait queues 1426 to 1428, the processing is executed in the order from step S901 to step S902, step S903, step S905, and step S906, and the double-sided printing target sheets 9D to 11D that were found in step S903 are fed, instead of the first sheet in the sheet feed wait queue 1426-1428, and printing is performed on the first side thereof.

In sheet feed wait queues 1429 to 1431, the processing is executed in the order from step S901 to step S902, step S903, step S905, and step S904, the single-sided printing target sheets 6S to 8S at the head in the respective sheet feed wait queues 1429-1431 are fed, and single-sided printing is performed thereon.

In FIG. 13A to 13C, it has been described that, when the number of successive single-sided printing target sheets between two double-sided printing targets is less than "the number of sheets of double-sided circulation of the normal double-sided −1 ("8", here)", which is a threshold value, the forced double-sided or the overtaking double-sided is advantageous relative to the normal double-sided. Moreover, in FIG. 14A to 14C, it has been described that, when the number of successive single-sided printing target sheets between two double-sided printing targets is further less than that of the case in FIG. 13A to 13C, the forced double-sided is advantageous relative to the overtaking double-sided. The threshold value in this case is "the number of sheets of double-sided circulation of the normal double-sided+1)/2 ("5" in the example in the first embodiment)". In the example in FIG. 14A to 14C, it can be understood that, when the number of single-sided printing target sheets that are present between two double-sided printing target sheets is "3", the processing time is shortened in the forced double-sided relative to the overtaking double-sided in an amount corresponding to two sides of sheets, as indicated by a reference numeral 1451.

Figure 15A:
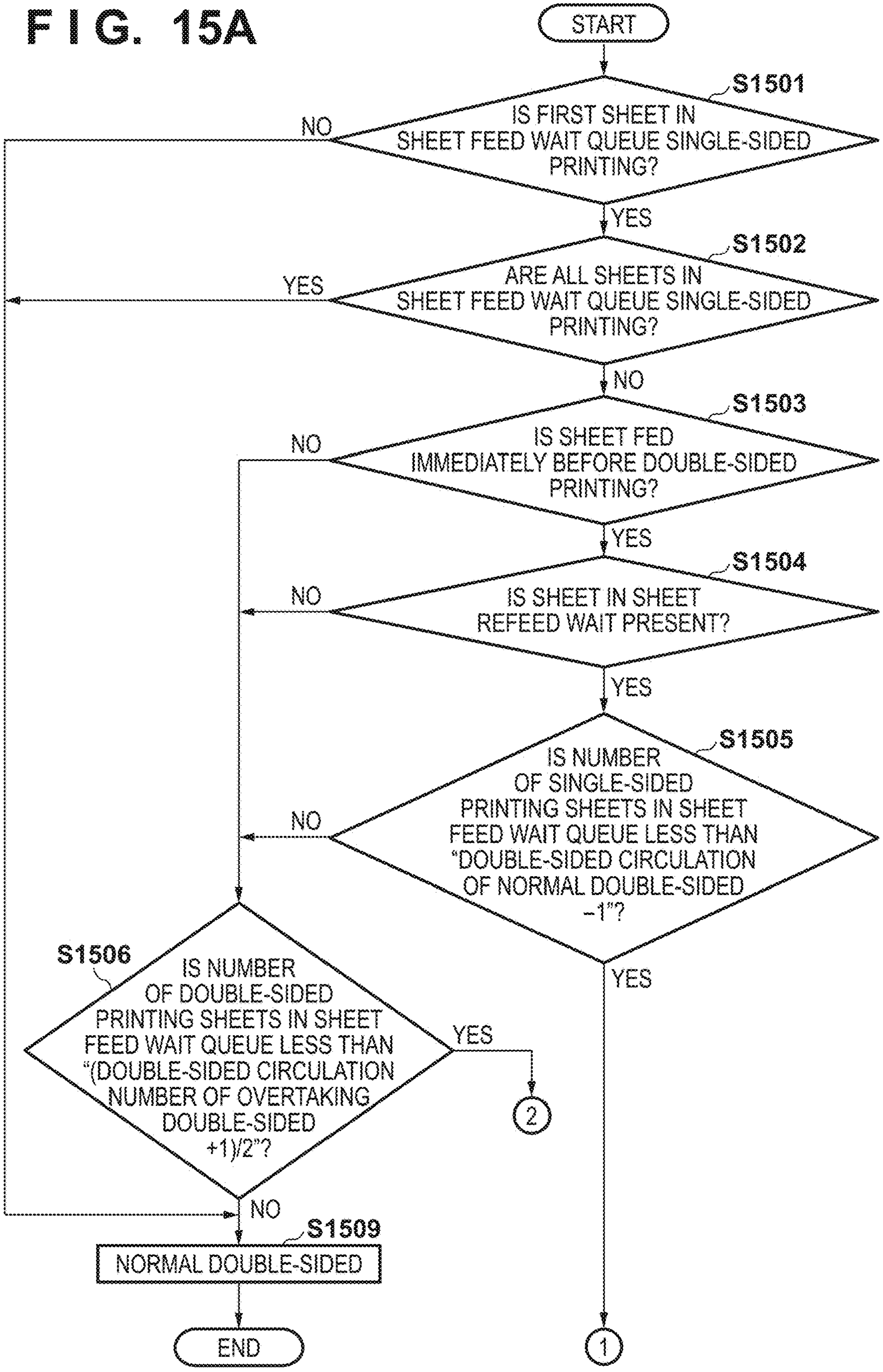
FIGS. 15A and 15B are flowcharts for describing a control method at the time of switching control between normal double-sided, overtaking double-sided, and forced double-sided in the image forming apparatus according to the first embodiment.
Figure 15B:
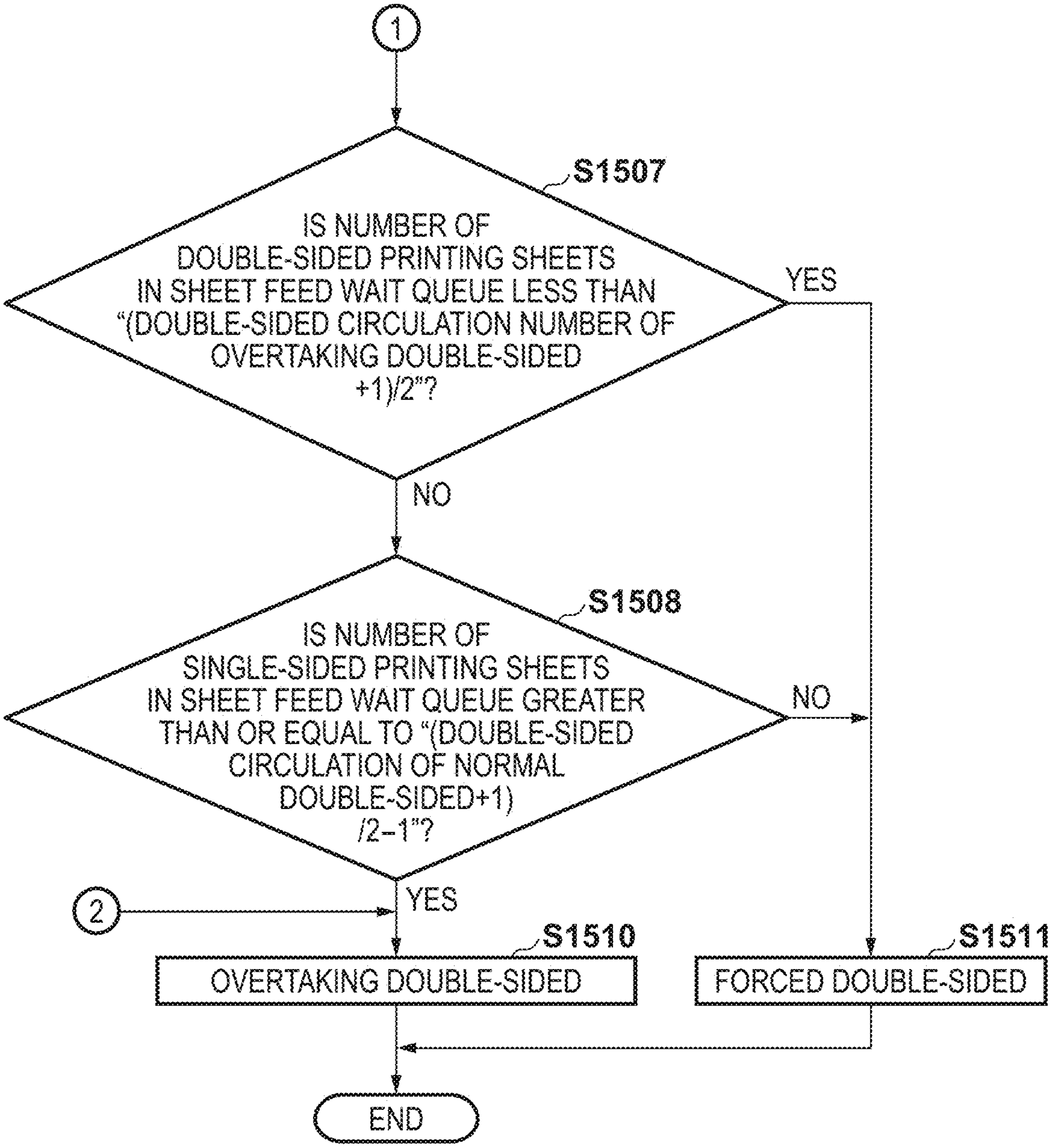

FIGS. 15A and 15B are flowcharts for describing a control method at the time of switching control between the normal double-sided, the overtaking double-sided, and the forced double-sided in the image forming apparatus 101 according to the first embodiment. Note that the processing described in this flowchart is executed at each timing at which one sheet is fed (timing at which the sheet feed wait queue is processed). Also, the processing described in this flowchart is achieved by the CPU 305 executing a program deployed in the RAM 306.

In step S1501, the CPU 305 determines whether or not the first sheet of the sheet feed wait queue on the RAM 306 is a single-sided printing target sheet. Note that the sheet feed wait queue is created according to the rule described with reference to FIGS. 7C, 8, and the like. If it is determined to be a single-sided printing target sheet, the processing is advanced to step S1502, and if it is determined to be a double-sided printing target sheet, the processing is advanced to step S1509, and the normal double-sided is performed. This is because, if the first sheet in a sheet feed wait queue is a double-sided printing target sheet, double-sided printing has to be executed, and therefore the normal double-sided is performed.

In step S1502, the CPU 305 determines whether or not all sheets waiting for being fed are single-sided printing target sheets. If it is determined that all sheets in the sheet feed wait queue are single-sided printing target sheets, the processing is advanced to step S1509, and operations according to the normal double-sided will be performed. On the other hand, if at least one sheet is a double-sided printing target sheet, the processing is advanced to step S1503. This is because, if all sheets are single-sided printing target sheets, the state in which single-sided and double-sided are mixed is not achieved, and therefore the control for improving the performance itself such as the forced double-sided or the overtaking double-sided becomes meaningless. Therefore, the processing is advanced to a step in which normal double-sided operation is to be performed, and a single-sided printing target sheet is subjected to single-sided printing.

In step S1503, the CPU 305 determines whether or not the sheet that has been fed immediately before is a double-sided printing target sheet, and if it is determined to be the double-sided printing target sheet, the processing is advanced to step S1504, and if the sheet that has been fed immediately before is a single-sided printing target sheet, the processing is advanced to step S1506. Step S1506 is a step in which the forced double-sided is excluded. The forced double-sided is not established if the sheet that has been fed immediately before is the single-sided printing target sheet. Therefore, if the sheet that has been fed immediately before is the single-sided printing target sheet, the forced double-sided is excluded. The fact that the forced double-sided is disadvantageous when the sheet that has been fed immediately before is the single-sided printing target sheet has been described with reference to FIGS. 10A and 10B.

In step S1504, the CPU 305 determines whether or not a sheet waiting for being refed is present in the sheet feed wait queue. If the sheet waiting for being refed is not present, the processing is advanced to step S1506, and if the sheet waiting for being refed is present, the processing is advanced to step S1505. This is because, if the sheet that has been fed immediately before has been subjected to paper refeeding for double-sided printing (second side) (not first side in double-sided printing), a state is achieved in which the sheet is ready to be discharged to the outside of the image forming apparatus as a sheet on which double-sided printing has already performed. The forced double-sided is control in order to not interrupt the double-sided circulation even if a single-sided printing target sheet is present, and therefore it is not established if a sheet waiting for being refed is not present and the double-sided circulation is interrupted. Therefore, when a sheet waiting for being refed is not present, the forced double-sided is excluded.

In step S1505, the CPU 305 determines whether or not the number of single-sided printing target sheets, among the sheets waiting for being fed in the sheet feed wait queue, is less than "the number of sheets of double-sided circulation of the normal double-sided −1" (less than a first threshold value). If the determination is affirmative, the processing is advanced to step S1507, and if the number is "the number of sheets of double-sided circulation of the normal double-sided −1" or more (greater than or equal to the first threshold value), the processing is advanced to step S1506. This is because, when a single-sided printing target sheet is mixed between a plurality of double-sided printing target sheets, if the number of successive single-sided printing target sheets is more than a predetermined number of sheets, the performance of the forced double-sided becomes disadvantageous. Therefore, if single-sided printing target sheets of the number greater than or equal to "the number of sheets of double-sided circulation of the normal double-sided −1" are present, the forced double-sided is excluded. This case has been described with reference to FIGS. 11A to 11C.

In step S1506, the CPU 305 determines whether or not the number of double-sided printing target sheets, among the sheets waiting for being fed in the sheet feed wait queue, is less than "(the number of sheets of double-sided circulation of the overtaking double-sided+1)/2" (less than a second threshold value). If the number is less than "(the number of sheets of double-sided circulation of the overtaking double-sided+1)/2", the CPU 305 selects the overtaking double-sided in step S1510. On the other hand, if the number is more than "(the number of sheets of double-sided circulation of the overtaking double-sided+1)/2" (greater than or equal to the second threshold value), in step S1506, the CPU 305 selects the normal double-sided in step S1509, and ends this processing. This is because, if the number of double-sided printing target sheets, among the sheets waiting for being refed, is greater than or equal to "(the number of sheets of double-sided circulation of the overtaking double-sided+1)/2", there is a waste period in which the double-sided circulation cannot be continued and paper feeding is not performed. This case has been described with reference to FIGS. 12A to 12C.

In the example in FIGS. 11A-11C described above, a case is illustrated in which printing is executed on five double-sided printing target sheets (1 to 5), ten single-sided printing target sheets (6 to 15), and five double-sided printing target sheets (16 to 20). Also, FIGS. 12A to 12C illustrates a case where printing is executed on five double-sided printing target sheets (1 to 5), ten single-sided printing target sheets (6 to 15), and three double-sided printing target sheets (16 to 18). In FIGS. 12A to 12C, the number of double-sided printing sheets next to the single-sided printing sheet is less than that in FIGS. 11A to 11C by two. Therefore, in FIG. 12C, a sheet is not present on which double-sided printing needs to be performed after the double-sided circulation being interrupted, as the nineteenth and twentieth sheets in FIG. 11C. Therefore, the performance of the overtaking double-sided becomes better.

In step S1507, the CPU 305 determines whether or not the number of double-sided printing target sheets, among the sheets waiting for being fed in the sheet feed wait queue, is less than "(the number of sheets of double-sided circulation of the overtaking double-sided+1)/2" (less than the second threshold value), and if the determination is affirmative, the CPU 305 advances the processing to step S1511, selects the forced double-sided, and ends this processing. On the other hand, in step S1507, if the CPU 305 determines that the number of double-sided printing sheets, among the sheets waiting for being fed, is more than "(the number of sheets of double-sided circulation of the overtaking double-sided+1)/2" (greater than or equal to the second threshold value), the processing is advanced to step S1508. Step S1507 is a step that is executed when the number of single-sided printing target sheets that are present between double-sided printing target sheet bundles is determined to be less than the predetermined number of sheets, in the determination in steps S1503, S1504, and S1505. That is, this is a case where it is determined that the overtaking double-sided or the forced double-sided is advantageous relative to the normal double-sided. This case has been described with reference to FIG. 13A to 13C. Moreover, step S1507 is a step of confirming whether a waste period is present in which paper feeding is not performed due to the double-sided circulation being interrupted at the time of overtaking double-sided, similarly to step S1506. If a description is given using the example in FIG. 13C, when the double-sided circulation cannot be continued, and as a result, the wait time until being printed is long, and sixteenth and seventeenth double-sided printing target sheets are present, the performance of the forced double-sided in FIG. 13B is better. On the other hand, regarding a case until fifteenth sheet in which the sixteenth and seventeenth double-sided printing target sheets are not present, the performance of the overtaking double-sided in FIG. 13C is better.

In step S1508, the CPU 305 determines whether or not the number of single-sided printing target sheets, among the sheets waiting to be fed in the sheet feed wait queue, is greater than or equal to "(the number of sheets of double-sided circulation of the normal double-sided+1)/2-1" (greater than or equal to a third threshold value). Here, if it is determined that the number is greater than or equal to the third threshold value, the CPU 305 selects the overtaking double-sided in step S1510, and ends this processing. On the other hand, in step S1508, if the number of single-sided printing target sheets is less than "(the number of sheets of double-sided circulation of the normal double-sided+1)/2-1" (less than the third threshold value), the CPU 305 selects the forced double-sided in step S1511, and ends this processing. This case has been described with reference to FIGS. 14A-14C. This indicates that, if the number of single-sided printing target sheets that are successively present between double-sided printing target sheets is less than the predetermined number of sheets, the forced double-sided is advantageous relative to the overtaking double-sided.

As described above, according to the first embodiment, when a print job in which a single-sided printing target sheet and a double-sided printing target sheet are mixed is executed, the image forming apparatus can execute the job while appropriately selecting the most suitable single/double mixed print control method at the timing of paper feeding, in accordance with the contents of the job and the information regarding the sheet feed wait queue.

Second Embodiment

Next, a second embodiment of the invention will be described using a diagram for describing a UI in FIG. 16. Note that the configuration of an image formation system according to the second embodiment, the hardware configuration of an image forming apparatus 101, and the like are similar to those of the first embodiment described above, and therefore the description thereof will be omitted. The image forming apparatus according to the second embodiment can selectively executing the normal double-sided, the overtaking double-sided, and the forced double-sided, similarly to the image forming apparatus according to the first embodiment.

Figure 16:
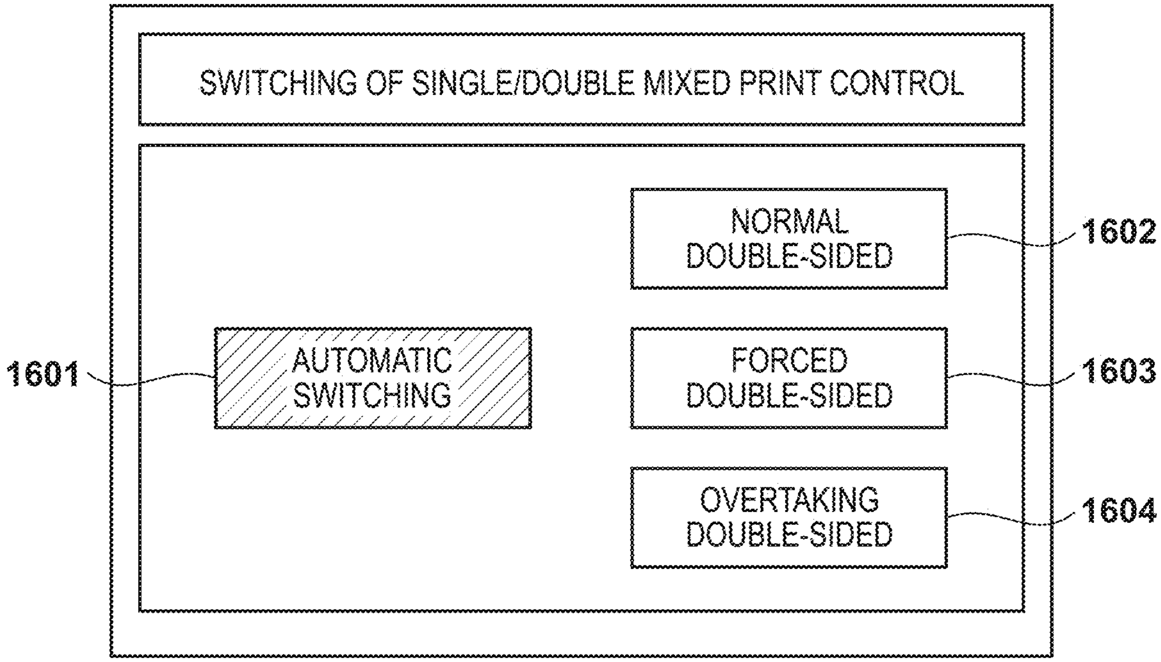
FIG. 16 is a diagram illustrating an exemplary screen to be displayed in a console unit of an image forming apparatus according to a second embodiment.

FIG. 16 is a diagram illustrating an exemplary screen to be displayed on a console unit 202 of the image forming apparatus 101 according to the second embodiment.

FIG. 16 illustrates a UI for a user to switch the single/double mixed print control. The setting made by the user is retained in a RAM 306 or an HDD 311 via a console unit interface 307.

This screen includes an automatic switching button 1601, a normal double-sided button 1602, a forced double-sided button 1603, and an overtaking double-sided button 1604. These buttons are formed as a toggle button, and only one of the buttons 1601 to 1604 can be selected. In FIG. 16, the automatic switching button 1601 is selected, and therefore the button is displayed in a reverse mode.

Figure 17A:
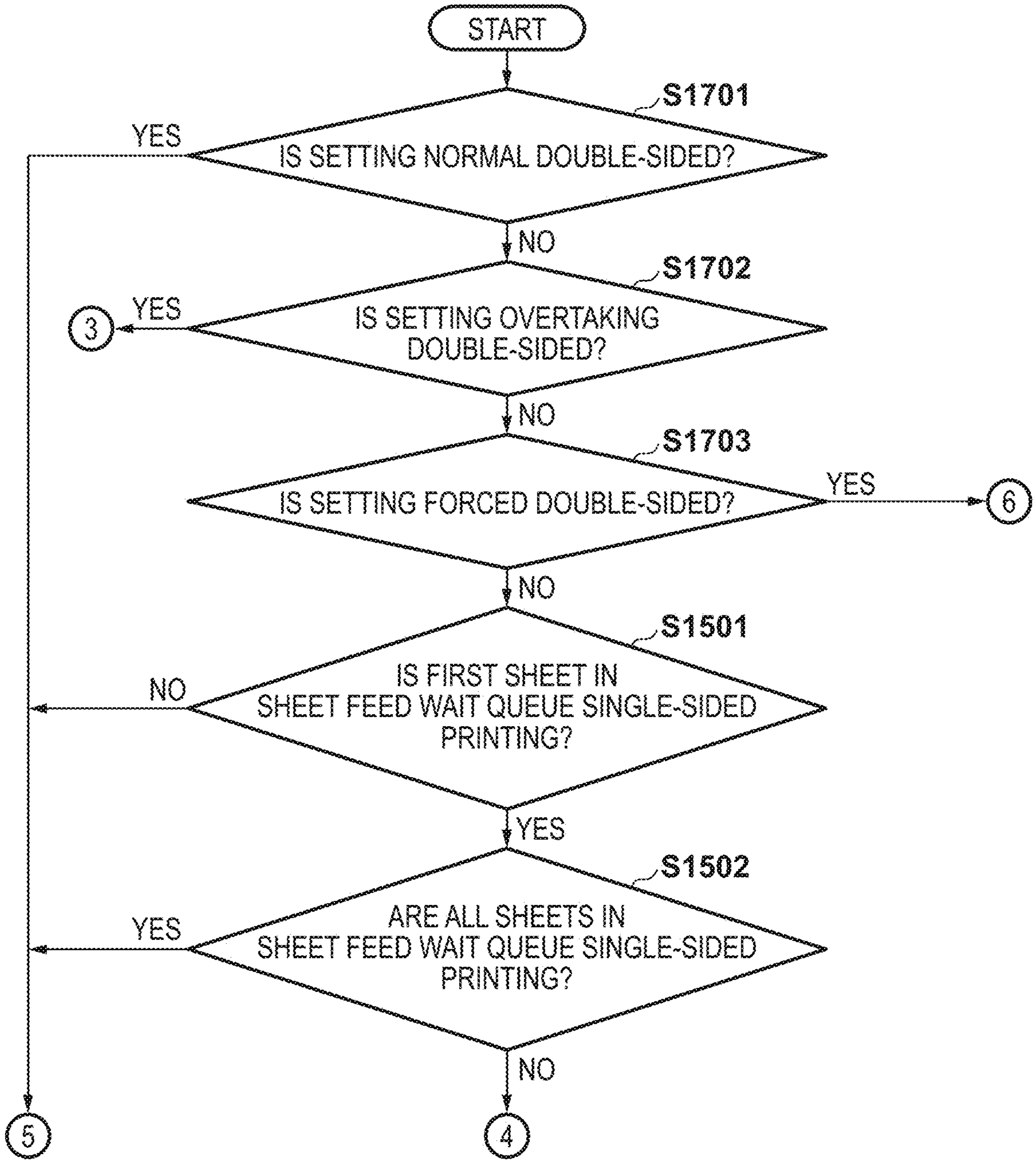
FIGS. 17A and 17B are flowcharts for describing a control method at the time of switching control between the normal double-sided, the overtaking double-sided, and the forced double-sided in the image forming apparatus according to the second embodiment.
Figure 17B:
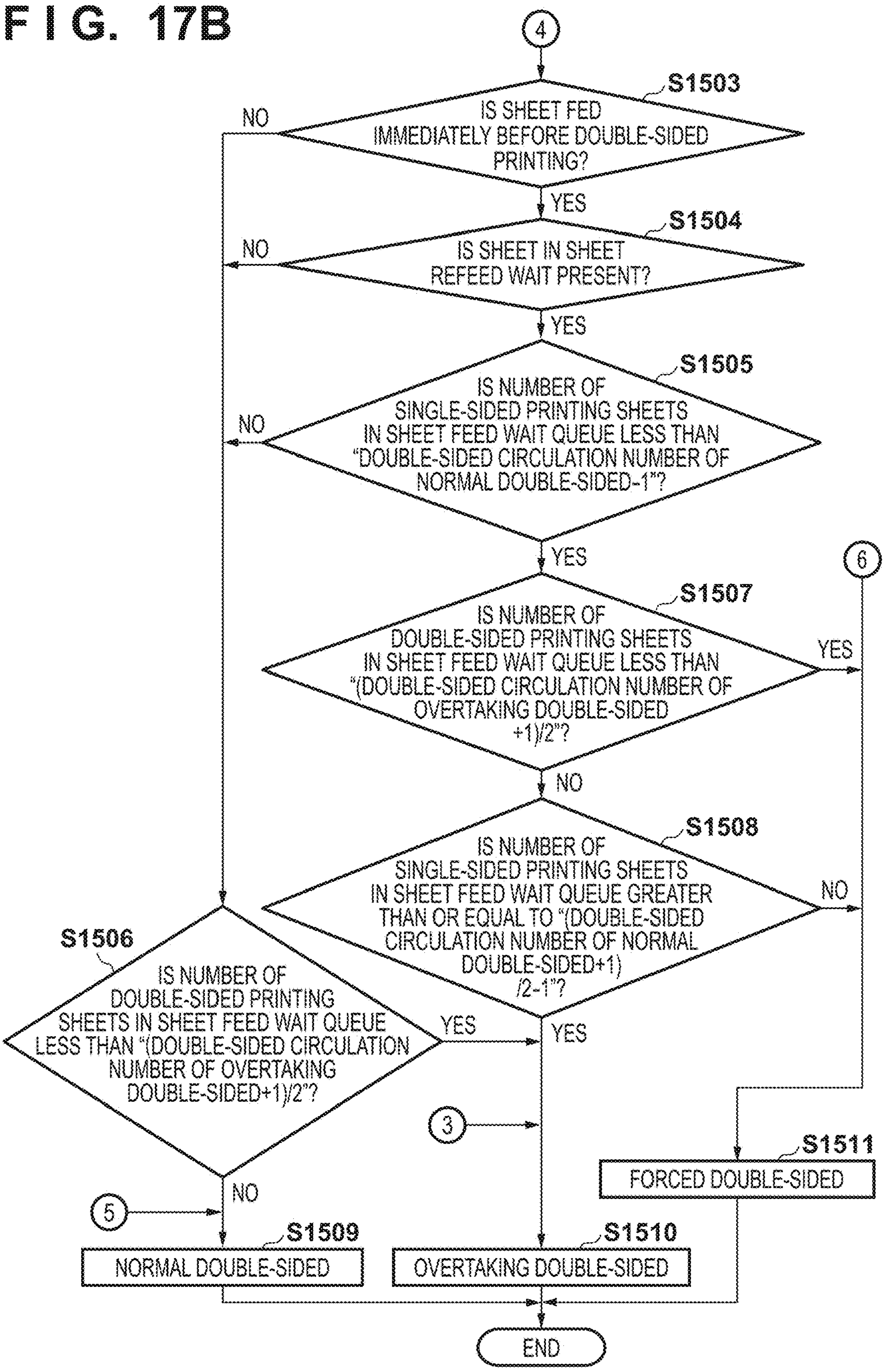

FIGS. 17A and 17B are flowcharts for describing a control method at the time of switching control between the normal double-sided, the overtaking double-sided, and the forced double-sided in the image forming apparatus 101 according to the second embodiment. Note that the processing described in this flowchart is achieved by a CPU 305 executing a program deployed in the RAM 306. Also, in FIGS. 17A and 17B, the steps in common with FIGS. 15A and 15B described above are given the same reference numerals, and the description thereof is omitted.

In step S1701, the CPU 305 reads out the setting value set by the user using the UI in FIG. 16 from the RAM 306 or the HDD 311, and determines whether or not the value set by the UI indicates the "normal double-sided". If the normal double-sided is selected, the CPU 305 advances the processing to step S1509, selects the normal double-sided control, and ends this processing. If not, in step S1702, the CPU 305 determines whether or not the value set by the UI in FIG. 16 indicates the "overtaking double-sided". If the overtaking double-sided is selected, the CPU 305 selects the overtaking double-sided in step S1510, and ends this processing.

Also, if the "overtaking double-sided" is not selected in step S1702, in step S1703, the CPU 305 determines whether or not the setting value set by the user with the UI in FIG. 16 is the "forced double-sided". If the forced double-sided is determined, the CPU 305 advances the processing to step S1511, selects the overtaking double-sided, and ends this processing. Also, if the forced double-sided is not determined in step S1703, the processing is advanced to step S1501. Thereafter, the processing in steps S1501 to S1511 is similar to that in FIGS. 15A and 15B, and therefore the description thereof is omitted.

As described above, according to the second embodiment, when a print job is to be executed in which a single-sided printing target sheet and a double-sided printing target sheet are mixed, the image forming apparatus can appropriately select the most suitable single/double mixed print control method in accordance with the job contents and the information regarding the sheet feed wait queue, and can execute the job. Also, there is an effect that, with respect to a job in which single-sided printing and double-sided printing are mixed, setting can be configured such that a user can select any switching of the single/double mixed print control.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-89929, filed May 22, 2020, and Japanese Patent Application No. 2021-41643, filed Mar. 15, 2021, which are hereby incorporated by reference herein in their entirety.

What is claimed is:

1. A printing apparatus capable of receiving and executing a mixed print job in which single-sided printing and double-sided printing are mixed, the printing apparatus comprising:

a feeding unit that accumulates a plurality of sheets and feeds a sheet of the plurality of sheets;

a printer unit that prints an image on a sheet;

a double-sided conveyance path that includes a refeeding unit configured to refeed a sheet in which an image has been printed on a first side of the sheet and to feed the sheet in order to print an image on a second side of the sheet;

a memory device that stores instructions; and one or more processors that execute the instructions stored in the memory device to cause the printing apparatus to execute double-sided print processing in a case where a print job in which a page corresponding to a sheet for which double-sided printing is instructed is included but a page corresponding to a sheet for which single-sided printing is instructed is not included, wherein in a case where the double-sided print processing is performed on P sheets more than K sheets, the double-sided print processing including:

(1) first processing that feeds first to K-th sheets from the feeding unit and feeds the first to K-th sheets on each of which an image has been printed on a first side of the sheet to the double-sided conveyance path, (2) second processing that alternately executes refeed processing for refeeding a sheet from the refeeding unit and feed processing for feeding a sheet from the feeding unit after the first processing, and (3) third processing that refeeds P-(K-1)-th to P-th sheets from the refeeding unit after all sheets that are to be fed in the print job have been fed from the feeding unit, wherein the one or more processors decide to execute a first mixed print mode or a second mixed print mode based on a number of M in a case where a mixed print job including pages corresponding to L sheets for which the double-sided printing is instructed, pages corresponding to the M sheets for which the single-sided printing is instructed after the pages corresponding to the L sheets, and pages corresponding to N sheets for which the double-sided printing is instructed after the pages corresponding to the M sheets is executed, with L being equal to K, and M and N being equal to or more than 1, wherein a number K is the number of sheets, including a first sheet of the plurality of sheets for which the double-sided printing is to be performed in the double-sided print processing, that can be fed from the feeding unit from the time when the first sheet is fed from the feeding unit until the first sheet is fed from the refeeding unit, wherein, in the first mixed print mode, the one or more processors execute the double-sided print processing on the L sheets, the M sheets and the N sheets by treating the M sheets as sheets for which the double-sided printing is instructed but do not print on a second side of the M sheets fed from the refeeding unit, wherein, in the second mixed print mode, the one or more processors execute the double-sided printing on the L sheets for which the double-sided printing is instructed, feed at least a first sheet of the N sheets for which the double-sided printing is instructed from the feeding unit, after a last sheet of the L sheets has been fed from the refeeding unit and before a last sheet of the M sheets for which the single-sided printing is instructed is fed from the feeding unit print an image on a first side of the first sheet of the N sheets, and feed the first sheet of the N sheets from the refeeding unit after the last sheet of the M sheets is fed from the feeding unit, and each of the M sheets being not conveyed on the double-sided conveyance path, and wherein the one or more processors select the second mixed print mode in a case the number of M is larger than a predetermined number.

2. The printing apparatus according to claim 1, wherein the one or more processors select the first mixed print mode in a case the number of M is less than the predetermined number.

3. The printing apparatus according to claim 1, wherein K is decided based on a number of waiting positions at which a sheet is able to wait in the double-sided conveyance path according to the size of a sheet while the printer unit is printing.

4. The printing apparatus according to claim 2, wherein the predetermined number is decided based on a number of waiting positions at which a sheet is able to wait in the double-sided conveyance path according to a size of the sheet when the printer unit is printing.

5. A method of controlling a printing apparatus that includes a feeding unit that accumulates a plurality of sheets and feeds a sheet of the plurality of sheets, a printer unit that prints an image on a sheet, and a double-sided conveyance path that includes a refeeding unit configured to refeed a sheet in which an image has been printed printing on a first side of the sheet and to feed the sheet in order to print an image on a second side of the sheet, and can receive and execute a mixed print job in which single-sided printing and double-sided printing are mixed, the method comprising:

executing double-sided print processing in a case where a print job in which a page corresponding to a sheet for which double-sided printing is instructed is included but a page corresponding to a sheet for which single-sided printing is instructed is not included, wherein in a case where the double-sided print processing is performed on P sheets more than K sheets, the double-sided print processing including:

(1) first processing that feeds first to K-th sheets from the feeding unit and feeds the first to K-th sheets on each of which an image has been printed on a first side of the sheet to the double-sided conveyance path, (2) second processing that alternately executes refeed processing for refeeding a sheet from the refeeding unit and feed processing for feeding a sheet from the feeding unit after the first processing, and (3) third processing that refeeds P-(K-1)-th to P-th sheets from the refeeding unit after all sheets that are to be fed in the print job have been fed from the feeding unit;

deciding to execute a first mixed print mode or a second mixed print mode based on a number of M in a case where a mixed print job including pages corresponding to L sheets for which the double-sided printing is instructed, pages corresponding to the M sheets for which the single-sided printing is instructed after the pages corresponding to the L sheets, and pages corresponding to N sheets for which the double-sided printing is instructed after the pages corresponding to the M sheets is executed, with L being equal to K, and M and N being integers equal to or more than 1;

wherein a number of K is the number of sheets, including a first sheet of the plurality of sheets for which the double-sided printing is to be performed in the double-sided print processing, that can be fed from the feeding unit from the time when the first sheet is fed from the feeding unit until the first sheet is fed from the refeeding unit, in the first mixed print mode, executing the double-sided print processing on the L sheets, the M sheets and the N sheets by treating the M sheets as sheets for which the double-sided printing is instructed but do not print on a second side of the M sheets fed from the refeeding unit;

in the second mixed print mode, executing the double-sided printing on the L sheets for which the double-sided printing is instructed, feed at least a first sheet of the N sheets for which the double-sided printing is instructed from the feeding unit, after a last sheet of the L sheets has been fed from the refeeding unit and before a last sheet of the M sheets for which the single-sided printing is instructed is fed from the feeding unit and print an image on a first side of the first sheet of the N sheets, and feed the first sheet of the N sheets from the refeeding unit after the last sheet of the M sheets is fed from the feeding unit, and each of the M sheets being not conveyed on the double-sided conveyance path; and selecting the second mixed print mode in a case the number of M is larger than a predetermined number.

6. A non-transitory computer-readable storage medium storing a program for causing a processor to execute a method of controlling a printing apparatus that includes a feeding unit that accumulates a plurality of sheets and feeds a sheet of the plurality of sheets, a printer unit that prints an image on a sheet, and a double-sided conveyance path that includes a refeeding unit configured to refeed a sheet in which an image has been printed printing on a first side of the sheet and to feed the sheet in order to print an image on a second side of the sheet, and can receive and execute a mixed print job in which single-sided printing and double-sided printing are mixed, the method comprising:

executing double-sided print processing in a case where a print job in which a page corresponding to a sheet for which double-sided printing is instructed is included but a page corresponding to a sheet for which single-sided printing is instructed is not included, wherein in a case where the double-sided print processing is performed on P sheets more than K sheets, the double-sided print processing including:

(1) first processing that feeds first to K-th sheets from the feeding unit and feeds the first to K-th sheets on each of which an image has been printed on a first side of the sheet to the double-sided conveyance path, (2) second processing that alternately executes refeed processing for refeeding a sheet from the refeeding unit and feed processing for feeding a sheet from the feeding unit after the first processing, and (3) third processing that refeeds P-(K-1)-th to P-th sheets from the refeeding unit after all sheets that are to be fed in the print job have been fed from the feeding unit;

deciding to execute a first mixed print mode or a second mixed print mode based on a number of M in a case where a mixed print job including pages corresponding to L sheets for which the double-sided printing is instructed, pages corresponding to the M sheets for which the single-sided printing is instructed after the pages corresponding to the L sheets, and pages corresponding to N sheets for which the double-sided printing is instructed after the pages corresponding to M sheets is executed, with L being equal to K, and M and N being integers equal to or more than 1;

wherein a number of K is the number of sheets, including a first sheet of the plurality of sheets for which the double-sided printing is to be performed in the double-sided print processing, that can be fed from the feeding unit from the time when the first sheet is fed from the feeding unit until the first sheet is fed from the refeeding unit, in the first mixed print mode, executing the double-sided print processing on the L sheets, the M sheets and the N sheets by treating the M sheets as sheets for which the double-sided printing is instructed but do not print on a second side of the M sheets fed from the refeeding unit;

in the second mixed print mode, executing the double-sided printing on the L sheets for which the double-sided printing is instructed, feed at least a first sheet of the N sheets for which the double-sided printing is instructed from the feeding unit, after a last sheet of the L sheets has been fed from the refeeding unit and before a last sheet of the M sheets for which the single-sided printing is instructed is fed from the feeding unit and print an image on a first side of the first sheet of the N sheets, and feed the first sheet of the N sheets from the refeeding unit after the last sheet of the M sheets is fed from the feeding unit, and each of the M sheets being not conveyed on the double-sided conveyance path; and selecting the second mixed print mode in a case the number of M is larger than a predetermined number.

7. The printing apparatus according to claim 1, further comprising an input device being configured to input an instruction for selecting, in accordance with the number of the M, an automatic mode for selecting the first mixed print mode or the second mixed print mode, with respect to the mixed print job.

* * * * *